United States Patent

Butler et al.

[11] Patent Number: 5,835,103
[45] Date of Patent: Nov. 10, 1998

[54] APPARATUS USING MEMORY CONTROL TABLES RELATED TO VIDEO GRAPHICS PROCESSING FOR TV RECEIVERS

[75] Inventors: Donald S. Butler; Richard S. Amano, both of Scottsdale, Ariz.

[73] Assignee: General Instrument Corporation, Horsham, Pa.

[21] Appl. No.: 523,394

[22] Filed: Aug. 31, 1995

[51] Int. Cl.⁶ ..................................................... G09G 5/00
[52] U.S. Cl. ........................... 345/509; 345/501; 348/589
[58] Field of Search ................................... 345/133, 150, 345/113, 126, 185, 196, 199, 139, 201, 507, 509, 501, 521, 477, 437, 348; 395/507, 509, 512, 521, 427; 348/714, 715, 716, 718, 719, 589, 569, 570, 600, 584

[56] References Cited

U.S. PATENT DOCUMENTS

| | | | |
|---|---|---|---|
| 4,420,770 | 12/1983 | Rahman | 358/183 |
| 4,580,165 | 4/1986 | Patton et al. | 358/148 |
| 4,700,181 | 10/1987 | Maine | 340/747 |
| 4,714,428 | 12/1987 | Bunker et al. | 345/139 |
| 4,737,772 | 4/1988 | Nishi et al. | 340/703 |
| 4,754,270 | 6/1988 | Murauchi | 340/731 |
| 4,876,600 | 10/1989 | Pietzsch et al. | 358/183 |
| 4,951,038 | 8/1990 | Yanamura | 345/122 |
| 4,965,670 | 10/1990 | Klinefelter | 358/183 |
| 5,030,946 | 7/1991 | Yamamura | 340/750 |
| 5,056,143 | 10/1991 | Greaves et al. | 340/701 |
| 5,065,231 | 11/1991 | Greaves et al. | 358/22 |
| 5,089,811 | 2/1992 | Leach | 345/199 |
| 5,168,363 | 12/1992 | Kojima et al. | 348/718 |
| 5,179,642 | 1/1993 | Komatsu | 395/135 |
| 5,185,597 | 2/1993 | Pappas et al. | 340/709 |
| 5,235,677 | 8/1993 | Needle et al. | 395/131 |
| 5,258,826 | 11/1993 | Wakeland et al. | 358/12 |
| 5,258,843 | 11/1993 | Truong | 358/183 |
| 5,285,193 | 2/1994 | Iwasaki et al. | 345/133 |
| 5,313,231 | 5/1994 | Yin et al. | 345/199 |
| 5,355,175 | 10/1994 | Okada et al. | 348/595 |
| 5,357,286 | 10/1994 | Hwang | 348/589 |
| 5,369,418 | 11/1994 | Richards | 345/201 |
| 5,389,947 | 2/1995 | Wood et al. | 345/145 |
| 5,519,825 | 5/1996 | Naughton et al. | 395/173 |
| 5,552,804 | 9/1996 | Leach | 345/199 |

FOREIGN PATENT DOCUMENTS

| | | |
|---|---|---|
| 0573822 | 12/1993 | European Pat. Off. . |
| 0633693 | 1/1995 | European Pat. Off. . |
| 9430008 | 12/1994 | WIPO . |

*Primary Examiner*—Lun-Yi Lao
*Attorney, Agent, or Firm*—Volpe and Koenig, P.C.

[57] ABSTRACT

Apparatus for processing mixed video and graphic signals for display on a television receiver includes a Graphics Memory and a Memory Controller and Sprite State Machine. The Graphics Memory includes a Sprite List table, a Sprite Data table, and other optional tables. The Sprite List table lists one or more graphics in a predetermined sequence for display on the television receiver, and stores general information related to the graphics within control words in each listing. The Sprite Data table stores pixel data for horizontal lines of each of the graphics which are accessed by a control word in each of the graphic listings in the Sprite List table. An optional Line Control table contains control words that are accessed via the graphic listing for providing independent controls for each of the horizontal lines obtained from the Sprite Data table to produce predetermined special effects. An optional Span List table is used to determine which of the graphic listings occur on a horizontal line to cause an accessing of only those occurring graphic listings for assembling pixel data for that horizontal line. The Memory Controller and Sprite State Machine accesses the tables of the Graphics Memory in a predetermined sequence in order to assemble and display each of the graphics and their special effects at predetermined locations in the horizontal lines on a screen of the television receiver. The Memory Controller and Sprite State Machine also uses field enable controls from the Sprite List Table for assembling one graphic on lines of a first filed and a second graphic on lines of a second field.

22 Claims, 9 Drawing Sheets

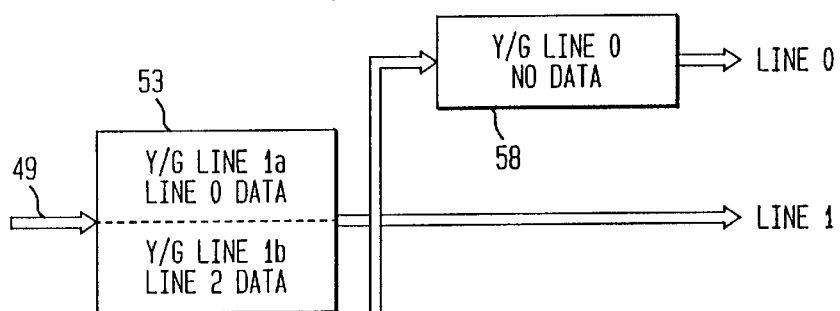
FIG. 4
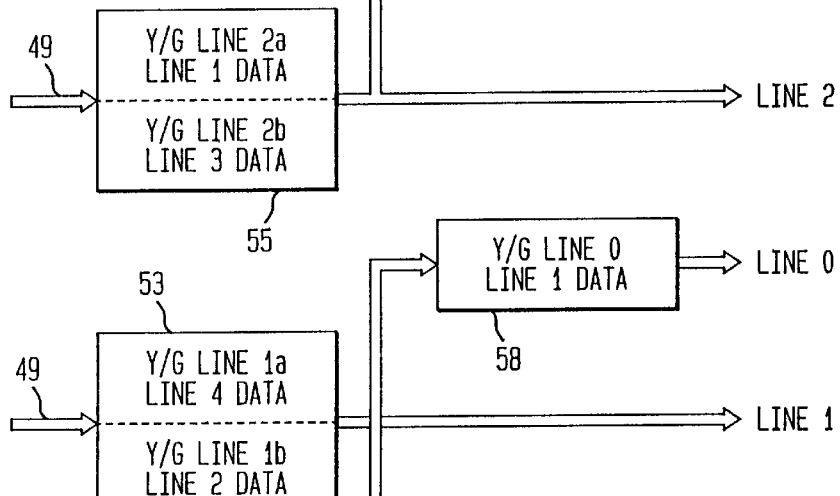
FIG. 5
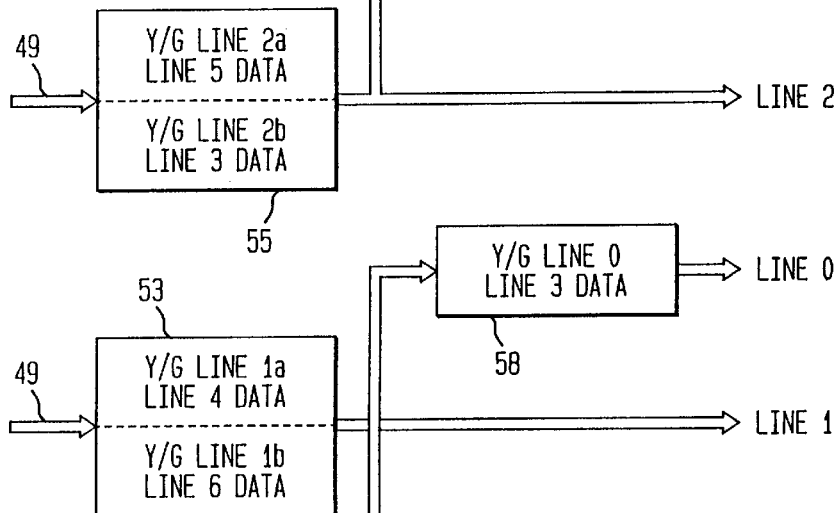
FIG. 6
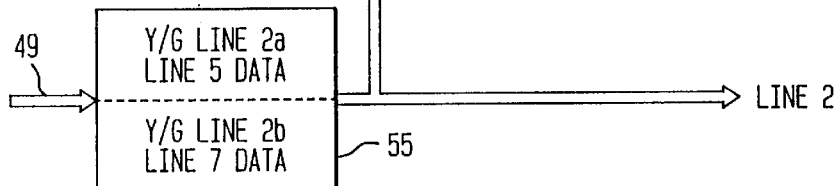

FIG. 17

| LINES | | 121 | 120 |
|---|---|---|---|
| 1 | SPRITE #1 | | |
| 2 | SPRITE #1 | SPRITE #2 | SPRITE #1 |
| 3 | SPRITE #1 | SPRITE #1 | SPRITE #1 |
| 4 | SPRITE #1 | SPRITE #2 | SPRITE #1 |
| 5 | SPRITE #1 | SPRITE #1 | SPRITE #1 |
| 6 | SPRITE #1 | SPRITE #2 | SPRITE #1 |
| 7 | SPRITE #1 | SPRITE #1 | SPRITE #1 |
| 8 | SPRITE #1 | | |
| 9 | SPRITE #1 | | |
| 10 | SPRITE #1 | | |
| 11 | SPRITE #1 | | |
| 12 | SPRITE #1 | | |
| 13 | SPRITE #1 | | |

APPARATUS USING MEMORY CONTROL TABLES RELATED TO VIDEO GRAPHICS PROCESSING FOR TV RECEIVERS

CROSS REFERENCE TO RELATED APPLICATIONS

This invention is related to the following applications, all of which are assigned to the assignee of the present invention, have common inventors, and are being filed concurrently: U.S. Pat. Ser. No. 08/523,395 (GID872), entitled "Method and Apparatus For Performing Two Dimensional Video Convolving", U.S. Pat. Ser. No. 08/523, 396 (GID906), entitled "Apparatus For processing Mixed YUV and Color Palettized Video Signals", and U.S. Pat. Ser. No. (GID907), entitled "Video magnification Apparatus".

FIELD OF THE INVENTION

The present invention relates to apparatus using memory control tables in a graphics memory for processing mixed YUV and color palettized graphic video signals to produce desired special effects. A memory controller and sprite state machine is used with the graphics memory for selectively displaying such graphic video signals by themselves or selectively superimposing such mixed graphic video signals on live television signals received from a remote source.

BACKGROUND OF THE INVENTION

Some commercially available computers, particularly personal computers, provide circuitry which permits a merger of a composite video signal, as, for example, a National Television Standards Committee (NTSC) signal, with computer generated video graphics display signals, typically red, green, and blue (RGB). More particularly, modern video graphics equipment has the ability to produce backgrounds, characters, symbols, and other pictorial representations and arrangements in operator-selected sizes, shapes, and colors.

U.S. Pat. No. 4,737,772 (Nishi et al.), issued on Apr. 12, 1988, discloses a video display controller comprising a video display processor (VDP), a Central Processing Unit (CPU), a memory, and a Video Random Access Memory (VRAM). The memory stores both programs to be executed by the CPU and various kinds of image data. The VRAM stores image data which the VDP can change and then transfer to the outside for display on a screen of a Cathode Ray Tube (CRT) display. In the VDP, a timing signal generator generates timing signals for correctly scanning elements of the picture to be displayed which are used by horizontal and vertical counters and the CRT display to synchronize data processing in an image data processing circuit (IDPC) and correctly display such processed data on the screen of the CRT display. A Video Digitizer samples an externally supplied analog video signal and converts signal levels or amplitudes of the analog video signal into digital data composed of 2 or 4 bits each. The digitized amplitude output data from the Video Digitizer represents a still image, and the data is supplied to the IDPC. The IDPC selectively stores both the Video Digitizer output data and color codes supplied from the CPU in the VRAM through an interface circuit. Each color code from the CPU represents a color of a respective one of the display elements (e.g. pixel) constituting a still image on the screen. In operation, in response to a display command from the CPU, the IDPC sequentially reads dot data from the VRAM in synchronization with the scanning position on the CRT display, and outputs the dot data to a color palette circuit. Concurrently, the IDPC calculates and reads data necessary for displaying an animation image from the VRAM and supplies color codes to the color palette circuit. Where an animation and still image are located at a same display position on the screen of the CRT display, the animation image is preferably displayed. The color palette circuit converts each color code into three color data for red (R), green (G), and blue (B), each composed of three bits. A Digital to Analog Converter (DAC) converts the color data from the color palette circuit into R, G, and B signals which are provided to the CRT display.

U.S. Pat. No. 5,355,175 (Okada et al.), issued on Oct. 11, 1994, discloses video mixing apparatus that mixes a graphics video image and a playback video image at a plurality of mixture ratios in one image plane. Fade data indicative of the mixing ratio of at least one line of the playback video signal and the graphics video signal is sequentially generated in accordance with a predetermined order. The fade data is held in holding means and is outputted from the holding means synchronously with a horizontal sync signal. The levels of the playback video signal and the graphics video signal are individually adjusted in accordance with the fade data outputted from the holding means, and the adjusted signals are added together. The playback video signal and the graphics video signal are mixed at the mixing ratio set for every line on one image plane to generate a video output signal from the apparatus.

U.S. Pat. No. 4,420,770 (Rahman), issued on Dec. 13, 1983, discloses a video background generation system for generating rectangular video patterns having operator-selected video attributes. The system comprises a horizontal bit memory and a vertical bit memory, each of the memories being a 16 entity memory for storing information for 16 background entities. The memory for each background entity defines opposite corners of the background area for an entity on the screen. As shown in FIG. 2 of the patent, a first entity defines a first rectangular area, and a second higher priority entity defines a second partially overlapping rectangular area. An attribute look-up table stores information for each entity related to the color video output (red, green, blue) for that entity. During the scanning of the lines of a picture being produced, the first entity is produced in its defined area and the second entity is produced in its defined area. However, the second entity has a higher priority which results in the overlapping region of the two entities to be presented with the stored attributes of the second entity.

U.S. Pat. No. 4,754,270 (Murauchi), issued on Jun. 28, 1988, discloses digitized displaying apparatus which is capable of enlarging or reducing the size of a displayed picture on the screen of a raster scanning type display such as a CRT display. The apparatus comprises an addressable memory means, input data means, and variable address data generating means. The addressable memory means stores display data that is read out in a predetermined timing relationship with a raster scanning of the display to produce a display image. The input data means supplies numerical data that determines the size of the image. The variable address data generating means includes variable addressing increments for generating address data that is correlated with display data addresses that are stored in the memory means in order to output the display data. The variable address data generating means comprises arithmetic calculating means for digitally calculating addressing increments in response to the numerical data supplied by the input data means. Still further, in response to timing signals related to the scanning of the display, the variable address data generating means is responsive to the arithmetic calculating means to increment addresses for addressing the memory means according to the numerical data that determines the image size. More particularly, when displaying an original sized picture, a horizontal address of the memory means is incremented by a "1" every 200 nanoseconds. In other words, a dot size in the horizontal direction of the display has a 200 nanosecond displaying time to display the original size. The dot size in the horizontal direction can be enlarged or reduced by changing the displaying time of one dot in the horizontal direction by properly selecting addend data that is provided to the memory means. By appropriate setting of the addend data, the size of characters and the associated images on the display screen can be enlarged or reduced with respect to a nominal size.

Presently, there is emerging a need for interactive video graphics which will enable a whole new class of services to be delivered to the home via a cable television network. These new services will enhance the viewing experience for many traditional television programs while providing augmented services to others. However, NTSC and Phase Alternating Line (PAL) television receivers, unlike computer monitors, have a fairly low video bandwidth and employ an interlaced, not a progressive scan, display. These limitations place severe constraints on the generation of an artifact free high resolution synthetic video signal. Traditionally, consumer products, such as video games, avoid these problems by generating low resolution non-interlaced video signals. This approach results in images that are of low quality, have a "blocky" appearance, are limited in color choice, and take on a cartoon-like look. The generation of synthetic video that approaches broadcast quality requires that the generated synthesized signals emulate that of a video camera scanning a scene and the subsequent analog signal processing for such video camera signals. Therefore, it is desirable to provide a relatively inexpensive arrangement that uses memory tables for storing and processing many graphics (sprites) into various configurations and special effects while permitting good synthetic video graphics to be overlaid on top of each other or live television programming for viewing on a standard NTSC or PAL standard interlaced television receivers.

SUMMARY OF THE INVENTION

The present invention is directed to inexpensive apparatus using memory control tables for processing mixed YUV and color palettized graphic (sprite) video signals to produce desired special effects, and selectively displaying such graphic video signals by themselves or selectively superimposing such mixed graphic video signals on live television signals received from a remote source.

Viewed from one aspect, the present invention is directed to apparatus for processing mixed video and graphic signals for display on a standard television receiver comprising a graphics memory and a memory controller and sprite state machine. The graphics memory comprises a sprite list table, a sprite data table, and a line control table. The sprite list table lists one or more graphics in a predetermined sequence for display on the television receiver, and for storing general information related to one or more graphics within control words in each listing. The sprite data table stores pixel data for horizontal lines of each of the one or more graphics where the horizontal lines in the sprite data table for each of the one or more graphics is accessed by a control word in the listing in the sprite list table for each of the one or more graphics. The line control table comprising control words that are accessed by a control word in the listing of predetermined ones of the one or more graphics in the sprite list table. The line control table control words for a graphic provides independent controls for selectively relocating pixel data in each of the horizontal lines obtained from the sprite data table to produce a predetermined special effect for each of the predetermined ones of the one or more graphics. The memory controller and sprite state machine accesses the tables of the graphics memory in a predetermined sequence in order to assemble and display each of the one or more graphics at predetermined locations in the horizontal lines on a screen of the television receiver.

Viewed from another aspect, the present invention is directed to apparatus for processing mixed video and graphic signals for display on a standard television receiver comprising a graphics memory and a memory controller and sprite state machine. The graphics memory comprises a sprite list table, a sprite data table, and a span list table. The sprite list table lists one or more graphics in a predetermined sequence for display on the television receiver and for storing general information related to one or more graphics within control words in each listing. The sprite data table stores pixel data for horizontal lines of each of the one or more graphics. The horizontal lines in the sprite data table for each of the one or more graphics is accessed by a control word in the listing in the sprite list table for each of the one or more graphics. The span list table comprises at least one span list control word for a predetermined number of horizontal lines forming each of a plurality of predetermined separate sections of the screen of the television receiver. The one or more span list control words define which of a plurality of N graphic listings in the sprite list table are active and appear in the associated predetermined section. The memory controller and sprite state machine first accesses the at least one span list control word in the span list table when assembling a predetermined section of a screen of the television receiver. Then, the memory controller and sprite state machine only accesses the graphic listings in the sprite list table and the sprite data table that are found active and appear in the at least one span list word.

Viewed from still another aspect, the present invention is directed to apparatus for processing mixed video and graphic signals for display on a standard television receiver comprising a graphics memory and a memory controller and sprite state machine. The graphics memory comprises a sprite list table, and a sprite data table. The sprite list table lists one or more graphics in a predetermined sequence for display on the television receiver. The sprite list table also stores general information related to the one or more graphics within control words in each listing. The sprite data table stores pixel data for horizontal lines of each of the one or more graphics. The horizontal lines in the sprite data table for each of the one or more graphics is accessed by a control word in the listing in the sprite list table for each of the one or more graphics. The memory controller and sprite state machine is responsive to field enable signals from the sprite list table indicating which field of a two-field frame of a video picture is being displayed on a screen of the television receiver for accessing and assembling a first predetermined graphic listed in the sprite list table for horizontal lines of only one of the two fields and a second predetermined graphic listed in the sprite list table or a live television signal for horizontal lines of the other one of the two fields.

The invention will be better understood from the following more detailed description taken with the accompanying drawings.

BRIEF DESCRIPTION OF THE DRAWINGS

FIGS. 4, 5, and 6 illustrate the operation of a Pixel Assembly Buffer forming part of the first portion of the Video Processing Circuitry of FIG. 3 in accordance with the present invention;

FIG. 17 is an exemplary section of an interlaced television receiver screen wherein a first and second sprite are interleaved in a portion of the screen in accordance with a third embodiment of the present invention.

DETAILED DESCRIPTION

It is to be understood that corresponding elements performing the same function in each of the figures have been given the same designation number.

Figure 1:
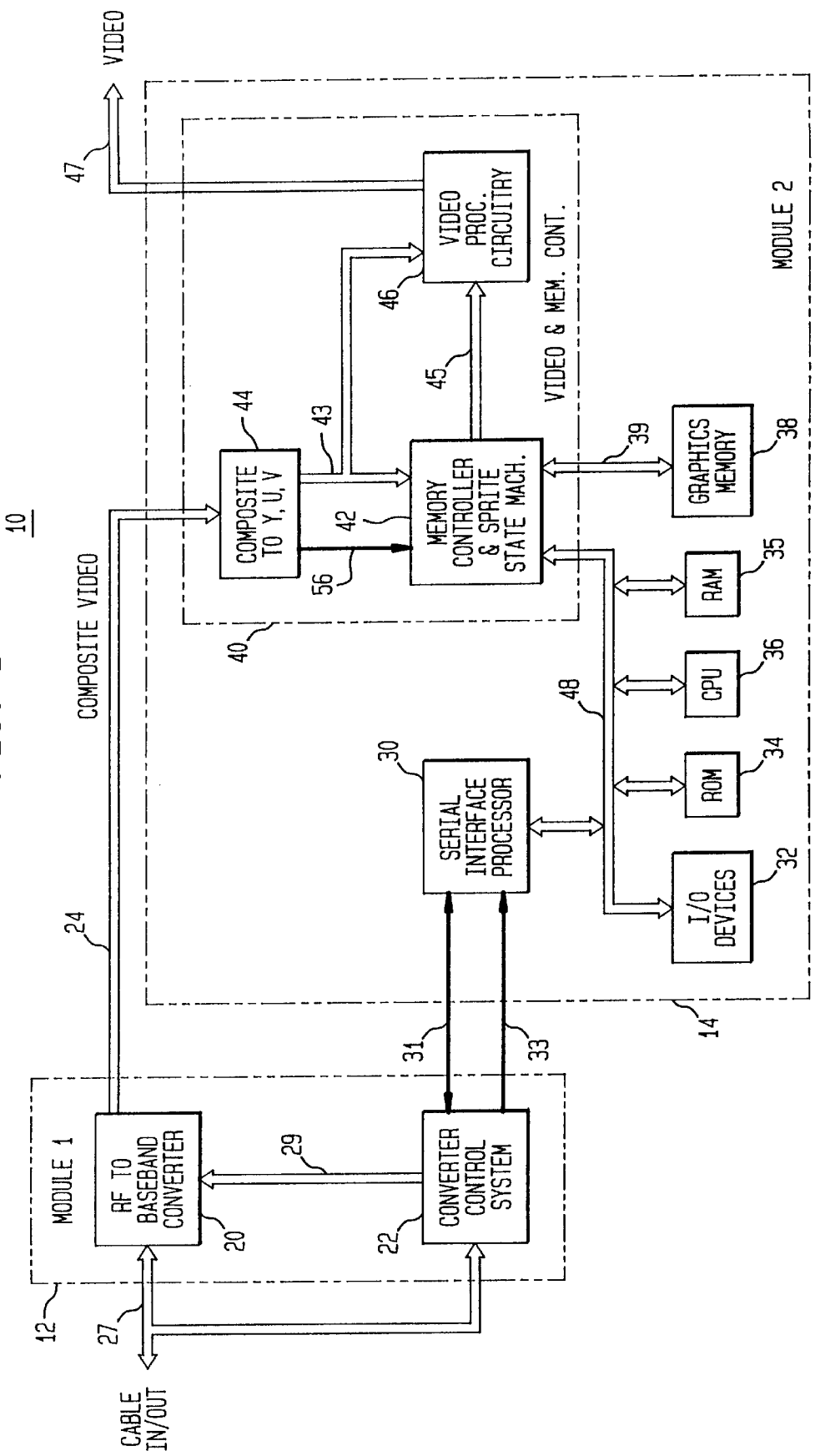
FIG. 1 is a block diagram of a subscriber cable box unit in accordance with the present invention.

Referring now to FIG. 1, there is shown a block diagram of a subscriber cable box unit 10 that can be found on a subscriber's premises and provides interactive video processing in accordance with the present invention. The subscriber cable box unit 10 comprises a first module (MODULE 1) 12 (shown within a first dashed line rectangle) and a second module (MODULE 2) 14 (shown within a second dashed line rectangle). The first module 12 is a conventional arrangement that comprises a Radio Frequency (RF) to Baseband Converter 20 and a Converter Control System 22, which are each known in the art. The RF to Baseband Converter 20 receives multiplexed RF television channel signals in the NTSC or PAL standard format propagating on a cable 27 from a remote cable company central office (not shown), and selectively converts such multiplexed RF television channel signals from their multiplexed channel frequencies to baseband frequencies. The RF to Baseband Converter 20 transmits a resultant baseband composite video output signal from the conversion process over a bus 24 to the second module 14. The Converter Control System 22 is user (subscriber) is typically controlled by either an Infra Red remote control device or a keypad on the cable box as is well known in the art. The Converter Control System 22 functions to receive and/or transmit authorization and access control signals via the cable 27 to or from a remote cable company central office, activate baseband video scrambling or descrambling, and produce On Screen Display (OSD) messaging. The Converter Control System 22 outputs control signals via a bus 29 to the RF to Baseband Converter 20 for selecting desired channel programming, and various control and decrypted data signals (e.g., control and upstream data output signals, Infra Red receive and transmit signals, and decrypted T1 Quadrature Phase Shift Keying data signals) via leads 31 and 33 to the second module 14.

The second module 14 comprises a Serial Interface Processor (SIP) 30, Input/Output (I/O) devices 32, a Read Only Memory (ROM) 34, a Random Access Memory (RAM) 35, a Central Processing Unit (CPU) 36, a Graphics Memory 38, and a Video and Memory Control (VIDEO & MEM. CONT.) integrated circuit 40 (shown within a dashed line rectangle). The SIP 30, I/O devices 32, ROM 34, RAM 35, CPU 36, and a Memory Controller and Sprite State Machine (MACH.) 42 of the Video and Memory Control integrated circuit 40 are interconnected by a data bus 48. The CPU 36 can comprise any suitable processing unit and, in accordance with the present invention, is a 386 type CPU which is relatively inexpensive. The ROM 34 can comprise any suitable memory as, for example, an EPROM for initialization purposes and for programming of the CPU 36. The RAM 35 can comprise any suitable memory as, for example, two 256 Kilobyte-by-16 bit DRAMs connected in series to provide a 512K-by-16 bit RAM configuration for use as a scratchpad memory for the CPU 36. The Graphics Memory 38 can comprise any suitable memory as, for example, a 32 bit wide RAM area or preferably two 256K-by-16 bit DRAMs arranged in parallel for use with a 32-bit wide bus 39. The Graphics Memory 38 is used to store sprite data relating to graphics and video pictures. The use of a 32-bit wide bus 39 permits the use of fast-page mode memory addressing for both a Memory Controller and Sprite State Machine 42 and a block memory mover (not shown) forming part of the Video and Memory Controller 40. By significant use of block mode memory addressing, an average data transfer rate of approximately 52 nanoseconds can be achieved, which corresponds to processing approximately 77 million bytes of data per second.

The SIP 30 functions to handle data communications between the first module 12 and the second module 14. More particularly, the SIP 30 handles all data transfer signals between the second module 14 and the converter control system 22 of the first module 12. These data transfer signals can have formats such as, for example, a T1-like data stream at 1.5 Mbits/second which involves the bulk of the communication transfers, and raw data from an infrared receiver (not shown) in the converter control system 22. The SIP 30 can also include a full duplex synchronous serial port (not shown) for future expansion. Such data transfer signal formats are used to communicate between the converter control system 22 on the first module 12 and the CPU 36 in the second module 14 to activate desired actions in the second module 14.

The Video and Memory Control integrated circuit 40 comprises the Memory Controller and Sprite State Machine 42, Composite to YUV circuitry 44, and Video Processing (PROC.) circuitry 46. The Memory Controller and Sprite State Machine 42 is coupled to the Graphics Memory 38 by a data bus 39, and to the Video Processing circuitry 46 by a data bus 45. The Composite to YUV circuitry 44 receives the baseband composite video signal from the bus 24 and outputs resultant YUV video signals to the Memory Controller and Sprite State Machine 42 on a bus 43. The Video Processing circuitry 46 receives video signals from the Memory Controller and Sprite State Machine 44 over the data bus 45, and outputs NTSC or PAL standard video signals on a bus 47 to a remote television receiver (not shown) or further processing circuitry (not shown). It is to be understood that the present invention lies within the area of the Video and Memory Control integrated circuit 40 and the Graphics Memory 38. The elements of the first module 12 and the second module 14 were introduced and discussed hereinbefore for a better understanding of how the present invention fits into the interactive subscriber cable box unit 10.

Figure 2:
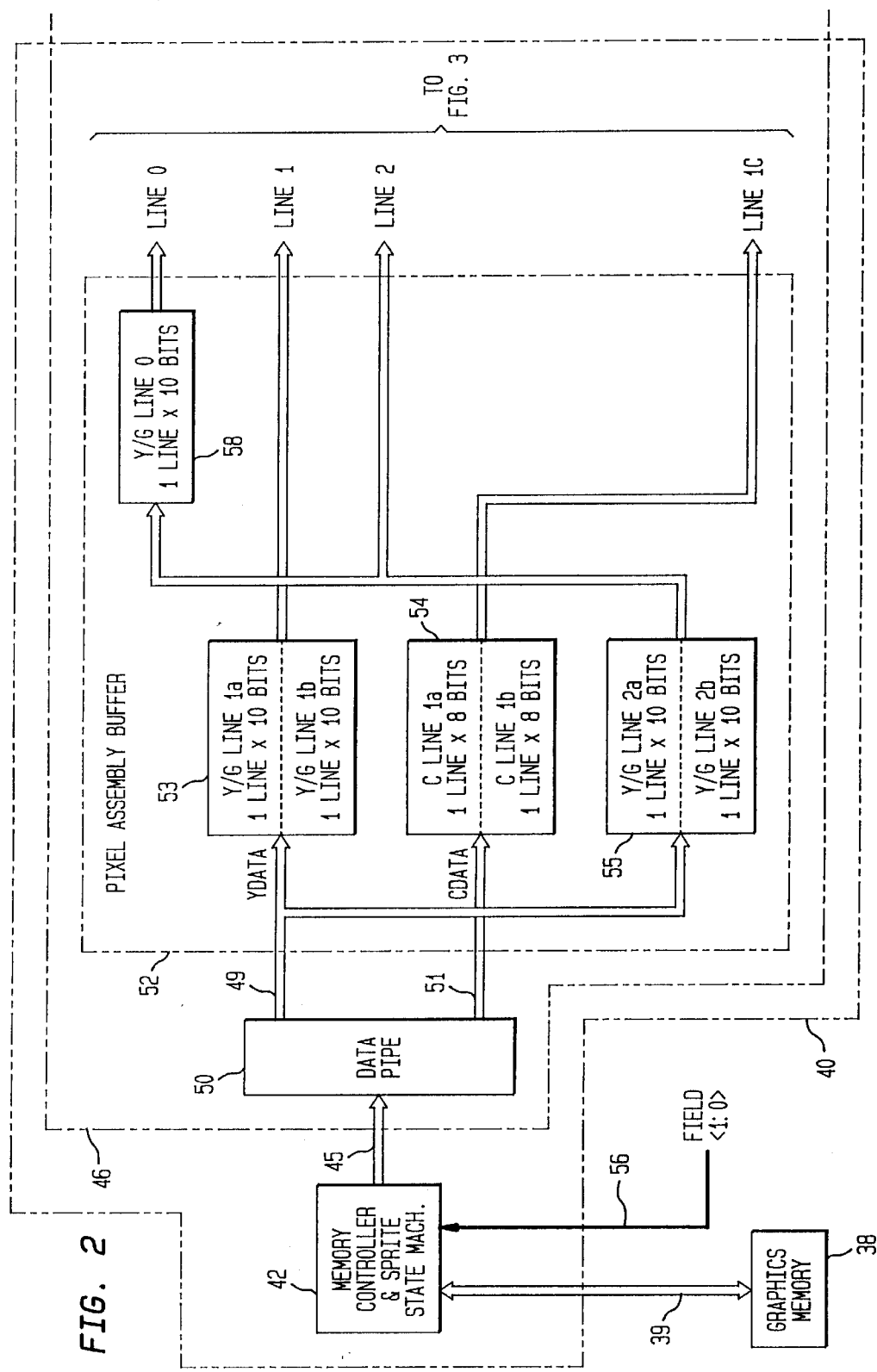
FIG. 2 is a block diagram of a first portion of Video Processing Circuitry found in the subscriber cable box unit of FIG. 1 in accordance with the present invention.
Figure 3:
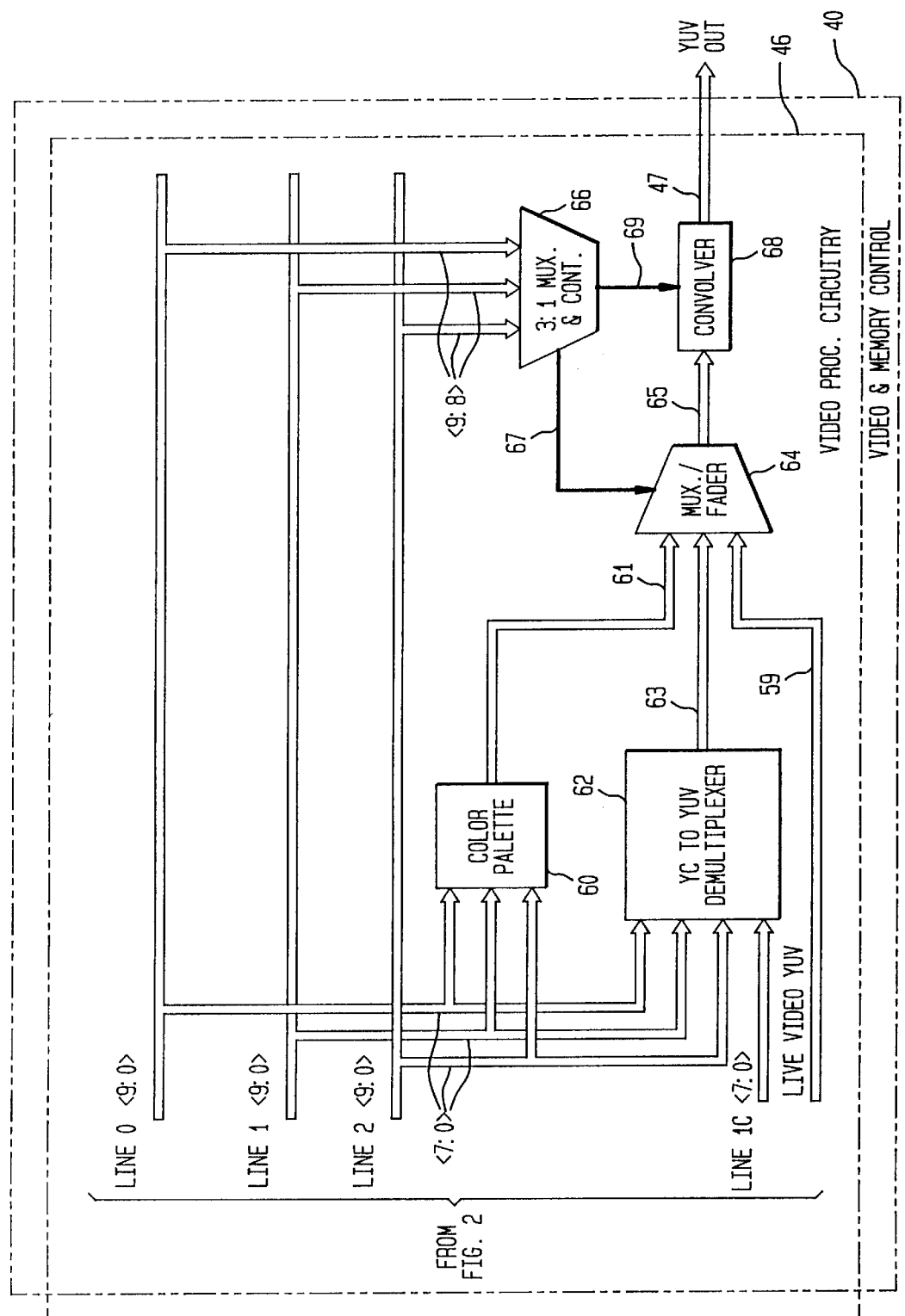
FIG. 3 is a block diagram of a second portion of Video Processing Circuitry found in the subscriber cable box unit of FIG. 1 in accordance with the present invention.

Referring now to FIGS. 2 and 3, there are shown block diagrams of first and second portions, respectively, of a Video Processing Circuitry 46 (shown within a dashed line area) found in the second module 14 of the subscriber cable box unit 10 of FIG. 1 in accordance with the present invention. As is shown in FIG. 2, a Graphics Memory 38, forming an element of the second module 14 of FIG. 1, is coupled via a data bus 39 to a Memory Controller and Sprite State Machine 42 which is part of a Video and Memory Controller 40 (shown within a dashed line area) of the second module 14 of FIG. 1. A first portion of the Video Processing Circuitry 46 comprises a Data Pipe 50, and a Pixel Assembly Buffer 52 (shown within a dashed line rectangle). The Data Pipe 50 receives data over a bus 45 that was obtained by the Memory Controller and Sprite State Machine 42 from the Graphics Memory 38 for a particular sprite for transmission to the Pixel Assembly Buffer 52. More particularly, the Data Pipe 50 receives data for a sprite from the Graphics Memory 38 via the Memory Controller and Sprite State Machine 42 and provides separate outputs as to luminance data (ydata) and chrominance data (cdata) for transmission to the Pixel Assembly Buffer 52.

The Pixel Assembly Buffer 52 comprises first, second, and third double line buffers 53, 54, and 55, respectively, and a Y/G Line 0 buffer 58. The first double line buffer 53 is used for storing Y/G (luminance) line 1*a* data and Y/G line 1*b* data for first and second lines of a first field of a sprite picture received via a bus 49 from the Data Pipe 50. The line luminance data comprises 10 bits (bits 9-0) of data and control for each pixel of a line. The second double line buffer 54 is used for storing C (chrominance) Line 1*a* and C Line 1*b* data of the first and second lines of the first field of the sprite picture received via a bus 51 from the Data Pipe 50. The line chrominance data comprises 8 bits (bits 7-0) of data for each pixel of a line. The third double line buffer 55 is used for storing Y/G (luminance) line 2*a* data and Y/G line 2*b* data of first and second lines of a second field of a sprite picture received via the bus 49 from the Data Pipe 50. The line luminance data comprises 10 bits (bits 9-0) of data and control for each pixel of a line. It is to be understood that the Lines 1*a* and 2*a* of the first and third double line buffers 53 and 55 store first and second horizontal lines of pixel data, respectively, where the first and second horizontal lines are adjacent lines within separate fields of the sprite picture in an interlaced display format. Similarly, Lines 1*b* and 2*b* of the first and third double line buffers 53 and 55 store third and fourth horizontal lines of pixel data, respectively, where the third and fourth horizontal lines are adjacent lines within separate fields of the sprite picture in an interlaced display format. In other words, the first and third double line buffers 53 and 55 sequentially store luminance data and control for, for example, pixels of a pair of odd and even lines, respectively, of respective first and second fields, or vice versa, of the sprite picture during a scanning of an interlaced display format. The second double line buffer 54 stores the chrominance data for the data of lines stored in the double line buffer 53. A chrominance double line buffer (not shown) similar to double line buffer 54 can be provided for double line buffer 55, but it is not necessary for reasons of economy and unimportance in a Convolver that will be explained hereinafter. The output data from the first double line buffer 53 comprises ten bits of luminance data and control for each pixel of the lines stored therein which is outputted in parallel for each pixel over a bus designated LINE 1 to circuitry in FIG. 3. The output data from the second double line buffer 54 comprises eight bits of chrominance data for each pixel of the lines stored therein which is outputted in parallel for each pixel over a bus designated LINE 1*c* to circuitry in FIG. 3. The output data from the third double line buffer 55 comprises ten bits of luminance data and control for each pixel of the lines stored therein which is outputted in parallel for each pixel over a bus designated LINE 2 to circuitry in FIG. 3 and to the Y/G Line 0 Buffer 58. The Y/G Line 0 Buffer 58 functions to delay the line data outputted by the third double line buffer 55 by one horizontal line period to provide a delayed line output comprising ten bits of luminance data and control for each pixel of the line stored therein which is outputted in parallel over a bus designated LINE 0 to circuitry in FIG. 3. It is to be understood that at a sampling rate of 13.5 MHz for the NTSC standard television display, there are 858 pixels per line of the picture of which only about 704 pixels are actually displayed, and that there are 525 horizontal lines of pixels in two fields of a picture of which about 440–500 lines are normally seen depending on the television receiver used.

Turning now to FIGS. 4, 5, and 6, there is shown an exemplary sequence of operation for the first and third double line buffers 53 and 55, respectively, and the Y/G Line 0 Buffer 58 of the Pixel Assembly Buffer 52 of FIG. 2 in accordance with the present invention. It is to be understood that in a normal operation of the double line buffers 53 and 55, a horizontal line of pixel data in a first field is inputted to one half of the first double line buffer 53 concurrent with a horizontal line of pixel data in a second field being inputted to one half of the third double line buffer 55. Concurrent with the inputting of horizontal lines of pixel data into first halves of the first and third double line buffers 53 and 55, horizontal lines of pixel data previously stored in the other halves of the first and third double line buffers 53 and 55 are read out on output LINES 1 and 2, respectively. In other words, for the first double line buffer 53, a first horizontal line of pixel data from the first field is inputted to, for example, the Y/G LINE 1*a* portion of the first double line buffer 53, and during a next horizontal line period a second horizontal line of pixel data from a first field of a frame is inputted to the Y/G LINE 1*b* portion of the first double line buffer 53 while the first horizontal line of pixel data from the Y/G LINE 1*a* portion is read out onto output LINE 1. During a next horizontal line period, a third horizontal line of pixel data from the first field is inputted to the Y/G LINE 1*a* portion of the first double line buffer 53 while the second horizontal line of pixel data from the Y/G LINE 1*b* portion is read out onto output LINE 1. Concurrently, first, second, and third horizontal lines of pixel data from a second field of the frame are similarly read into the third double line buffer 55 and outputted therefrom onto output LINE 2.

FIG. 4 shows an end point of an initialization stage of the Pixel Assembly Buffer 52 after the subscriber cable box unit 10 of FIG. 1 is first turned on. More particularly, on turn on, pixel data for a horizontal line 0 of a first field and pixel data for a horizontal line 1 of a second field are inputted to the Y/G line 1*a* portion of the first double line buffer 53 and the Y/G line 2*a* portion of the double line buffer 55, respectively, during a first horizontal line period. During a second horizontal line period, pixel data for a horizontal line 2 of a first field and pixel data for a horizontal line 3 of a second field are inputted to the Y/G line 1*b* portion of the first double line buffer 53 and the Y/G line 2*b* portion of the third double line buffer 55, respectively, while the pixel data for horizontal lines 0 and 1 are read out of Y/G line 1*a* portion of the first double line buffer 53 and the Y/G line 2*a* portion of the third double line buffer 55, respectively, on respective output LINES 1 and 2. Concurrent therewith, the pixel data for a horizontal line 1 from the Y/G line 2*a* portion of the third double line buffer 55 is inputted to Y/G Line 0 Buffer 58. Since the Y/G Line 0 Buffer 58 functions to delay horizontal line data stored therein by one horizontal line period, and the Buffer 58 had no data stored therein upon initialization, the output therefrom on output LINE 0 includes no valid data.

FIG. 5 continues the loading and outputting process after the initialization steps shown in FIG. 4. More particularly, pixel data for a horizontal line 4 of a first field and pixel data for a horizontal line 5 of a second field are inputted to the Y/G line 1*a* portion of the first double line buffer 53 and the Y/G line 2*a* portion of the third double line buffer 55, respectively, during a third horizontal line period. Concurrent therewith, the pixel data for the horizontal lines 2 and 3 are read out of Y/G line 1*b* portion of the first double line buffer 53 and the Y/G line 2*b* portion of the third double line buffer 55, respectively, on their respective output LINES 1 and 2. Concurrent therewith, the pixel data for the horizontal line 3 from the Y/G line 2*b* portion of the third double line buffer 55 is inputted to Y/G Line 0 Buffer 58 while the previously stored pixel data for the horizontal line 1 data is outputted on output LINE 0. Therefore, the Buffers 58, 53, and 55 are outputting pixel data for the horizontal lines 1, 2, and 3, respectively, for a sprite on respective output LINES 0, 1, and 2 during the third horizontal line period, where the pixel data for the horizontal lines 1 and 3 are part of the second field and the pixel data for the horizontal line 2 is part of the first field of a sprite picture that were stored in the Graphics Memory 38 (shown in FIGS. 1 and 2).

FIG. 6 continues the loading and outputting process from the step shown in FIG. 5. More particularly, pixel data for a horizontal line 6 of a first field and pixel data for a horizontal line 7 of a second field of a sprite are inputted to the Y/G horizontal line 1*b* portion of the first double line buffer 53 and the Y/G horizontal line 2*b* portion of the third double line buffer 55, respectively, during a fourth horizontal line period. Concurrent therewith, the pixel data for the horizontal lines 4 and 5 of the sprite are read out of Y/G horizontal line 1*a* portion of the first double line buffer 53 and the Y/G horizontal line 2*a* portion of the third double line buffer 55, respectively, on respective output LINES 1 and 2. Concurrent therewith, the pixel data for the horizontal line 5 from the Y/G line 2*a* portion of the third double line buffer 55 is inputted to Y/G Line 0 Buffer 58 while the previously stored pixel data for the horizontal line 3 data is outputted on output LINE 0. Therefore, the Buffers 58, 53, and 55 are outputting pixel data for the horizontal lines 3, 4, and 5, respectively, on respective output LINES 0, 1, and 2 during the fourth horizontal line period, where the data for the horizontal lines 3 and 5 are part of the second field of the sprite picture while the data for the horizontal line 4 is obtained from the first field of the sprite picture that were stored in the Graphics Memory 38 (shown in FIGS. 1 and 2). From FIGS. 5 and 6, it can be seen that after initialization (FIG. 4), the pixel data on the output LINE 1 represents data for sequential horizontal lines (e.g., even numbered horizontal lines (0–254) of an NTSC standard picture) of a first field of the two fields of a frame for an NTSC interlaced display. After the exemplary even numbered horizontal lines of the first field have been sequentially outputted on the output LINE 1 during sequential horizontal line periods, the output continues with sequentially numbered horizontal lines (e.g., odd numbered horizontal lines 1–255 of an NTSC standard picture) of the second field of the frame in the manner found for scanning an interlaced display. Although not shown in FIGS. 4–6, it is to be understood that the chrominance data is outputted on output LINE 1*c* from the second double line buffer 54 shown in FIG. 2, concurrent with the associated luminance pixel data for each horizontal line being outputted on output LINE 1.

Turning now to FIG. 3, there is shown a block diagram of a second portion of a Video Processing Circuitry 46 found in the subscriber cable box unit 10 of FIG. 1 in accordance with the present invention. The second portion of the Video Processing Circuitry 46 comprises Color Palette circuitry 60, a YC to YUV Demultiplexer 62, a Multiplexer/Fader (MUX./FADER) 64, a 3:1 Multiplexer and Control (3:1 MUX. & CONT.) 66, and a Convolver 68. The 10-bit pixel data (bits 9:0) propagating on each of LINES 0, 1, 2 from the output of the Pixel Assembly Buffer 52 of FIG. 2 for corresponding pixels in three adjacent horizontal lines of a sprite picture are received at separate inputs of each of the Color Palette circuitry 60, the YC to YUV Demultiplexer 62 and the 3:1 Multiplexer and Control 66. More particularly, bits 7-0 of the parallel 10-bit/pixel output from the Pixel Assembly Buffer 52 for each of output LINES 0, 1, and 2 are received at the inputs of the Color Palette circuitry 60 and the YC to YUV Demultiplexer 62, while bits 9 and 8 of the parallel 10-bit/pixel output from the Pixel Assembly Buffer 52 for each of output LINES 0, 1, and 2 are received at the inputs of the 3:1 Multiplexer and Control 66. Additionally, the YC to YUV Demultiplexer 62 receives the chrominance data bits 7-0 outputted in parallel on output LINE 1*c* from the Pixel Assembly Buffer 52 since the chrominance data is only used when the sprite pixel data relates to a True Color sprite signal. More particularly, where sprite data is encoded as a color palette signal, the code itself defines the color, and chrominance data is not required as is needed with a true color video signal.

The Color Palette circuitry 60 functions to detect when the 8 bits (bits 7:0) of parallel received pixel data on each of output LINES 0, 1, and 2 represent separate codes for particular colors of a color palette, and to convert those color palette codes into an output signal on bus 61 representing a 24-bit YUV multiplexed color palette signal for three 8-bit pixel data received for those three lines. Color Palette circuitry 60 is a well known device, and any suitable circuit can be used therefor. The YC to YUV Demultiplexer 62 detects when 8 bits (bits 7:0) of parallel received data for pixels on each of the output LINES 0, 1, and 2 from the Pixel Assembly Buffer 52 represents true color data (e.g., a sprite obtained directly from a television picture), and also uses the 8-bit chrominance data obtained via output LINE 1*c* from the Pixel Assembly Buffer 52 to generate a 24-bit True Color YUV output signal for pixels of the three lines for transmission on bus 63.

The Multiplexer/Fader (MUX./FADER) 64 receives, at separate inputs thereof, each of the 24-bit color palette YUV data signals propagating on a bus 61 from the Color Palette circuitry 60, the 24-bit true color YUV data signals propagating on bus 63 from the YC to YUV Demultiplexer 62, and 24-bit YUV live video signals on a bus 59. The Multiplexer/Fader 64 is responsive to control signals on a lead 67 from the 3:1 Multiplexer and Control 66 to output one of the three input signals (24-bit color palette YUV, 24-bit true color YUV, or 24-bit live video YUV) received at the Multiplexer/ Fader 64 during each pixel period as digitized YUV mixed output signals on a bus 65. More particularly, the 3:1 Multiplexer and Control 66 determines from the bits 9 and 8 received on the output LINES 0, 1, and 2 from the Pixel Assembly Buffer 52 whether the pixel data from the Pixel Assembly Buffer 52 on the output LINES 0, 1, and 2 represents color palette data, true color data, or data (non-valid data) for a pixel that is not part of a sprite to be overlaid on a live video signal, and, therefore, the live video signal should be used for that pixel instead of the color palette or true color data received from the Pixel Assembly Buffer 52. As a result of such control information obtained from bits 9 and 8 of output LINES 0, 1, and 2 from the Pixel Assembly Buffer 52, the 3:1 Multiplexer and Control 66 sends control signals over the lead 67 to the Multiplexer/Fader 64 to select the correct input data for each pixel of a picture to be displayed on a remote NTSC or PAL television receiver (not shown). The Convolver 68 uses sequential sets of three pixel data values received in the signal from the Multiplexer/ Fader 64 on bus 65 to provide an 8-bit weighted output signal for pixel data for a central pixel in a 3-by-3 matrix of corresponding pixels in three adjacent lines of a television picture or provide the signal from the Multiplexer/Fader 64 on bus 65 as a YUV output signal on bus 47 depending on control signals from the 3:1 Multiplexer and Control 66 over a lead 69.

Figure 7:
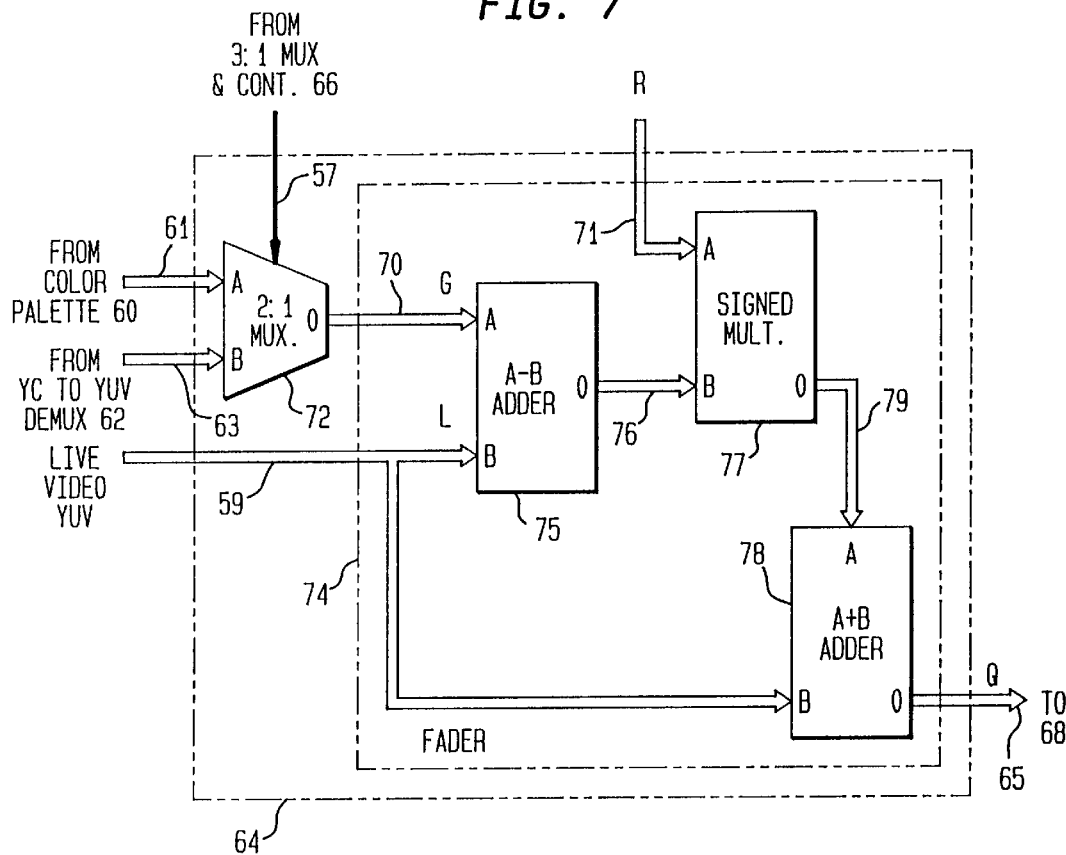
FIG. 7 is a block diagram of an exemplary Multiplexer/Fader forming part of a second portion of the Video Processing Circuitry shown in FIG. 3.

Referring now to FIG. 7, there is shown a block diagram of an exemplary Multiplexer/Fader circuit 64 (shown within a dashed line rectangle) which comprises a 2:1 Multiplexer (MUX.) 72, and a Fader 74 (shown within a dashed line rectangle). The Fader 74 comprises an A-B Adder 75, a Signed Multiplier (SIGNED MULT.) 77, and an A+B Adder 78. The 2:1 Multiplexer receives each of the Graphic data signals from the Color Palette 60 on bus 61 at a first input terminal (A), and the Graphic data signals from the YC to YUV Demultiplexer 62 on bus 63 at a second input terminal (B). A control signal on lead 67 from the 3:1 Multiplexer and Control 66 selects which of the two Graphic input signals (from input terminal A or B) will be output from the 2:1 Multiplexer 72 at output terminal (O). Pixel Graphic output signals (Y, U, or V) from an output terminal (O) of the 2:1 Multiplexer 72 (designated G) on a bus 70 are received at a first input terminal (A) of the A-B Adder 75 of the Fader 74. A live video YUV signal (Y, U, or V) (designated L) is received from a bus 59 at a second input terminal (B) of the A-B Adder 75. The pixel data values of the A terminal input data from the 2:1 Multiplexer 72 less the data values of the live video YUV pixel data received the B input terminal is provided as an output at an output terminal (O) of the A-B adder 75. The Signed Multiplier 77 receives from, for example, a register (not shown) a 9-bit changeable ratio control value (R) on a bus 71 at a first input terminal (A), and the output from the A-B Adder 75 on a bus 76 at a second input terminal (B). The resultant multiplied value of the ratio control value (R) on the bus 71 and the Graphic signal output data from the A-B Adder 75 on the bus 76 is output at an output terminal (O) on a bus 79 to a first input terminal (A) of the A+B Adder 78. The live video signal (Y, U, or V) on bus 59 is received at a second input terminal (B) of A+B Adder 78, and the sum of the two input signal values are provided as a output signal (designated Q) on the bus 65 to the Convolver 68 (shown in FIG. 3).

The Fader 74 functions to fade a graphic signal for a sprite in or out so that the graphic does not appear or disappear instantaneously over the live a video signal. In other words, for a graphic fade-in, the Fader 74 causes the graphic to appear with increasing intensity on a television receiver while the live video signal decreases in intensity in the area of the graphic over a short period of time so that the graphic is totally visible. Similarly, for a graphic fade-out, the Fader 74 causes the graphic to appear with decreasing intensity on a television receiver while the live video signal increases in intensity in the area of the graphic over a short period of time until the graphic disappears. The operation of the Fader 74 can be explained in accordance with the following algorithms. For the following, an exemplary 9-bit fade multiplier (R) bus 71 is defined as follows. From the above definitions, R is the fade control value and ranges from 0 to 256.

$$Q = [(R/256)*G] + [(1 - R/256)*L], \text{ and} \qquad \text{Eq. 1}$$
$$= L + [(G - L)*R]/256,$$

where "L" is a pixel value of the live video, "G" is a pixel value of the sprite overlay, and the symbol "*" represents a multiplying function. From Equation 1 above, as the ratio used for the multiplying value R changes, the intensity of the graphic and live video signals change in a opposite directions.

Figure 8:
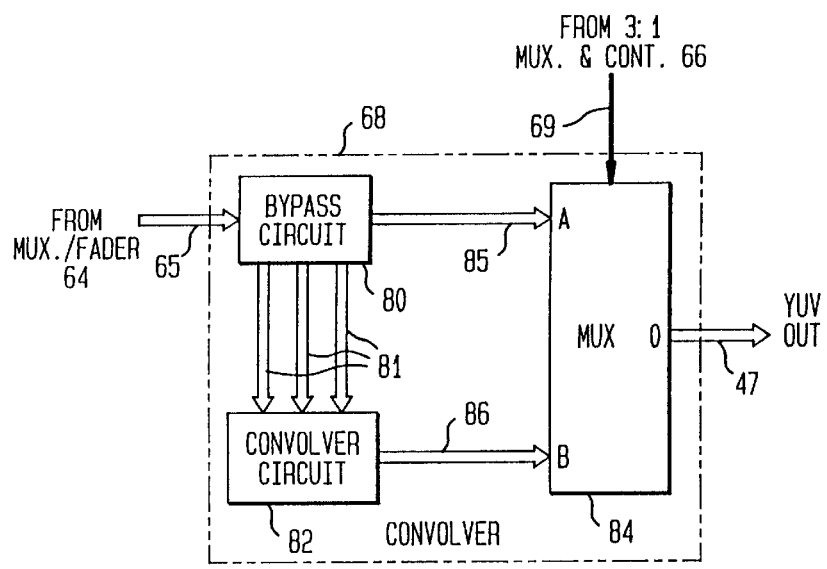
FIG. 8 is a block diagram of an exemplary arrangement of a Convolver forming part of the second portion of the Video Processing Circuitry shown in FIG. 3.

Referring now to FIG. 8, there is shown a block diagram of the Convolver 68 shown in FIG. 3. The Convolver 68 (shown within a dashed line rectangle) comprises a Bypass circuit 80, a convolver circuit 82, and a Multiplexer (MUX.) 84. The Bypass circuit 80 receives sequential pixel data from the Multiplexer/Fader 64 (shown in FIGS. 3 and 7) on bus 65, and concurrently generates therefrom data on buses 81 for three pixels in a vertical of a sprite to be displayed on a television receiver. More particularly, the three pixels are obtained from corresponding pixels in three adjacent lines of both fields of a frame making up a sprite picture. The three pixel data values are obtained by any suitable arrangement such as a plurality of delay circuits operating from a pixel clock or a three times pixel clock. The three pixel data values are received via buses 81 by the Convolver circuit 82. The sequential pixel data from the Multiplexer/Fader 64 is received by the Bypass circuit 80 on bus 65. The sequential pixel data from the Multiplexer/Fader 64 passes through the Bypass circuit 80 and is provided to a first input (A) of the Multiplexer 84 via a bus 85. Still further, the Bypass circuit 80 transmits sequential sets of three pixel data values from separate outputs thereof to separate inputs of the Convolver circuit 82 on buses 81. The Convolver circuit 82 provides an 8-bit weighted output signal for pixel data for a central pixel in a 3-by-3 matrix of corresponding pixels in three adjacent lines of a television picture to a second input (B) of the Multiplexer 84 via a bus 86. The Multiplexer 84 selects the signals at the first (A) or second (B) inputs for transmission to the output terminal (O) and bus 47 depending on control signals from the 3:1 Multiplexer and Control 66 over a lead 69.

As is disclosed in the copending patent application Ser. No. 08/523,395 filed on the same date as the present application for the present inventors and incorporated herein by reference, the Convolver circuit 82 effectively multiplies (using just adders and delays) the three pixels of a vertical received on buses 81 in a 3-by-3 matrix of pixels with predetermined weight values, and provides an averaged output signal for the central pixel of the 3-by-3 matrix to a second input (B) of the Multiplexer 84. This process continues for each pixel of a central row (output LINE 1 of the Pixel Assembly Buffer 52 of FIG. 2) as the sprite data for the corresponding pixels of the three adjacent lines as the pixel data progresses (shifts) horizontally across the sprite picture for three adjacent lines.

Figure 9:
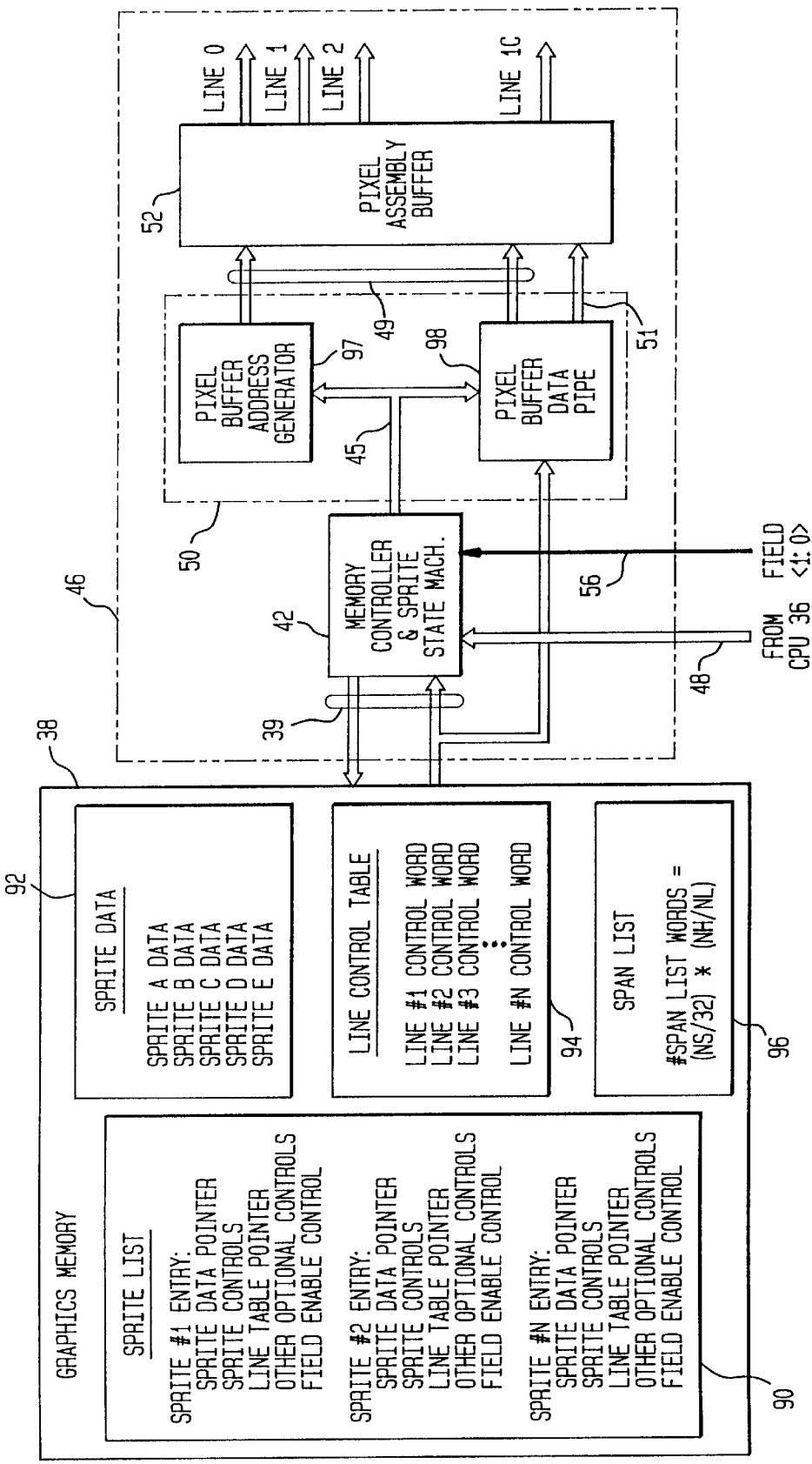
FIG. 9 is a block diagram of a Graphics Memory comprising tables, and the first portion of a Video Processing Circuitry shown in FIG. 2 in accordance with the present invention.

Referring now to FIG. 9, there is shown a Graphics Memory 38, and a portion of the Video Processing Circuitry 46 (shown within a dashed line rectangle) as is shown in FIG. 2 forming part of a Video and Memory Controller 40 of the second module 14 of FIG. 1. The Graphics Memory 38 is coupled via a data bus 39 to a Memory Controller and Sprite State Machine 42 forming part of the portion of the Video Processing Circuitry 46 for bidirectional communication. The Memory Controller and Sprite State Machine 42 is coupled to a Central Processing Unit (CPU) 36 (shown in FIG. 1) via a bus 48 for writing into the Graphics Memory 38 via the bus 39, and receives Field <1:0> signals from the Composite To Y,U,V circuitry 44 of FIG. 1 via conductor 56. This portion of the Video Processing Circuitry 46 further comprises a Data Pipe 50 (shown within a dashed-line rectangle), and a Pixel Assembly Buffer 52.

The Data Pipe 50 comprises a Pixel Buffer Address Generator 97 and a Pixel Buffer Data Pipe 98 which each receive an output signal from the Memory Controller and Sprite State Machine 42 via a bus 45. The Pixel Buffer Address Generator 97 and the Pixel Buffer Data Pipe 98 transmit separate address and pixel data output signals, respectively, to the Pixel Assembly Buffer 52 via respective buses 49 and 51. The Pixel Buffer Data Pipe 98 also receives the data on bus 39 directly from the Graphics Memory 38. The Pixel Buffer Address Generator 97 and the Pixel Buffer Data Pipe 98 use pixel data obtained from a Sprite Control word in a Sprite Entry, a Sprite Data table 92, and any other information from a Line Control table 94 in the Graphics Memory 38 to place the data for each pixel in the appropriate address location of the Double Line Buffers 53, 54, and 55 (shown only in FIG. 2) of the Pixel Assembly Buffer 52. As will be explained in more detail hereinafter, special effects like magnification, warping, etc. for horizontal lines of a Sprite Entry are obtained from the Sprite Control words in the associated Sprite Entry and from the Line Control table 94 of the Graphics Memory 38. The Pixel Buffer Address Generator 97 of the Data Pipe 50 uses this information to appropriately alter the pixel address in a line of sprite data obtained from the Sprite Data table 92 of the Graphics Memory 38 to achieve the designated special effect. This altered address is sent to the Pixel Assembly Buffer 52 for use in placing the associated pixel data in the pixel location designated by the altered address in the Double Line Buffer 53, 54, or 55 of the Pixel Assembly Buffer 52 to subsequently provide the designated special effect on the television screen. The Pixel Buffer Data Pipe 98 concurrently receives the pixel data for the pixel address, and transmits the pixel data to the Pixel Assembly Buffer 52 for storage at the address of the Double Line Buffer 53, 54, or 55 generated by the Pixel Buffer Address Generator 97. The Pixel Assembly Buffer outputs luminance pixel data for three adjacent horizontal lines of a sprite one buses designated LINE 0, LINE 1, and LINE 2, and outputs chrominance pixel data associated with the LINE 1 luminance output data on a LINE 1c as was explained hereinbefore for the Pixel Assembly Buffer in FIG. 2.

The Graphics Memory 38 comprises multiple Tables comprising the Sprite List table 90, the Sprite Data table 92, the Line Control table 94, and a Span List table 96. The Sprite List table 90 comprises a separate memory section for each of one or a plurality of N sprites (only entries for sprites #1, #2, and #N are listed). As is shown for the Sprite #1 entry, the memory section therefor comprises a Sprite Data Pointer portion, a Sprite Controls portion, a Line Table Pointer portion, an Other Optional Controls portion, and a Field Enable Control portion. The Sprite Data Pointer portion is used to access the Sprite Data Table 92 at a predetermined location associated with the Sprite Entry. The Sprite Controls portion comprises data relating to, for example, the size of the sprite, its X and Y location or position on the screen of the television receiver, and information about magnification, warping, etc. that is to be performed on the sprite. More particularly, if the Sprite Controls portion indicates that a sprite has a magnification of 2, then every line of the sprite is magnified by 2. Similarly, if the Sprite Controls portion indicates that a sprite has an offset of 2, then all lines of the sprite are offset by 2. The Sprite Controls portion affects each horizontal line of pixel data of the sprite the same way.

The Line Table Pointer portion of each Sprite Entry is used to access a predetermined portion of the Line Control Table 94 for control words associated with that Sprite Entry in order to produce more advanced special effects from that produced by the Sprite Controls portion discussed above. Finally, the Field Enable Control portion is used to produce "smoked glass" (transparent overlay) effects on the screen of the television receiver for the Sprite Entry being accessed in the Sprite List table 90. Similar portions are shown for each of the other sprite #2 to #N entries. Still further, the sprites in the Sprite List table 90 are preferably listed in order of increasing priority where, for example, the sprite #1 entry has a lowest priority and the sprite #N entry has a highest priority. As a result of such priority arrangement, pixels of a sprite with a higher priority overwrite, replace, or take precedence over pixels of a sprite with a lower priority where two sprites or a sprite and live video are located in an overlapping location on a screen of a television receiver.

The Sprite Data table 92 comprises data words including pure data for each of the pixels of each horizontal line for each Sprite Entry of the Sprite List table 90. In other words, when a Sprite Entry is accessed in the Sprite List table 90, the Sprite Data Pointer portion directs the access into the Sprite Data table 92 where the Sprite Data words (e.g., Sprite A Data word to Sprite C Data word) for that Sprite Entry are stored in the Sprite Data table 92 of the Graphics Memory 38. It is to be understood that these Sprite Data words do not include the numerical number of lines in the sprite since the size of the sprite, the location on the screen of the television receiver, etc., for that sprite is located in the Sprite Controls portion of the Sprite List Entry. The Sprite List table 90 and the Sprite Data table 92 work together by first accessing The Sprite List table 90 and then, under control of the Sprite Data Pointer portion, accessing the Sprite Data table 92 to retrieve the data that tells the Video Processing Circuitry 46 to draw the sprite in the manner described by the Sprite Data words.

The Line Control Table 94 of the Graphics Memory 38 is an optionally used table that contains subtables of separate predetermined lengths (only one subtable is shown including N control words), where each subtable comprises a separate line control word for each line of a sprite. The line control words in the Line Control Table 94 provide independent controls for the lines of that sprite. More particularly, as stated hereinabove, the Sprite Controls portion of each Sprite Entry in the Sprite List table 90 affect every line of a sprite in the same manner. In contrast, the Line Control Words in a subtable in the Line Control Table 94 for a Sprite Entry, as pointed to by the Line Table Pointer portion of the Sprite List table 90, are used to provide independent controls for each of the lines of that sprite. For example, it is assumed that the Sprite Controls portion for the Sprite #1 Entry indicates that the Sprite #1 image includes ten lines at a location X and Y on the screen of the television receiver without any special effects such as constant offsets. The pixel data for each of the ten lines of the Sprite #1 image is provided in the Sprite Data table 92 beginning at the address therein indicated by the Sprite Data Pointer portion of the Sprite #1 Entry. Special effects that might be used for any one or more of the ten lines of Sprite #1 are found in certain ones of the line control words in the Line Control Table 94 beginning at the address indicated by the Line Table Pointer portion of the Sprite #1 Entry. In other words, the edges of the image of Sprite #1 might be aligned in a straight line on the screen of the television receiver. However, with the line control words of the Line Control Table 94, each line of Sprite #1 Entry can have, for example, different offsets for warping the image in a predetermined manner. For example, a sprite image can be warped using the associated line control words Line Control table 94 to appear on the outside surface of a three-dimensional cylinder.

Figure 10:
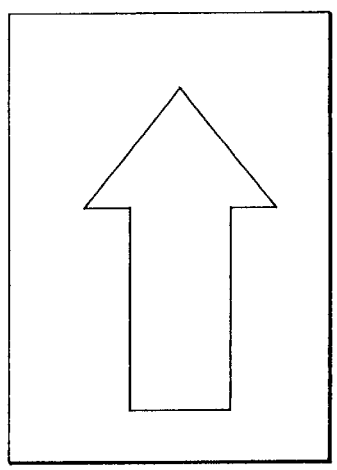
FIGS. 10, 11, 12, 13, 14, and 15 show various configurations that can be achieved using the tables of the Graphics Memory shown in FIG. 9 in accordance with a first embodiment of the present invention.
Figure 11:
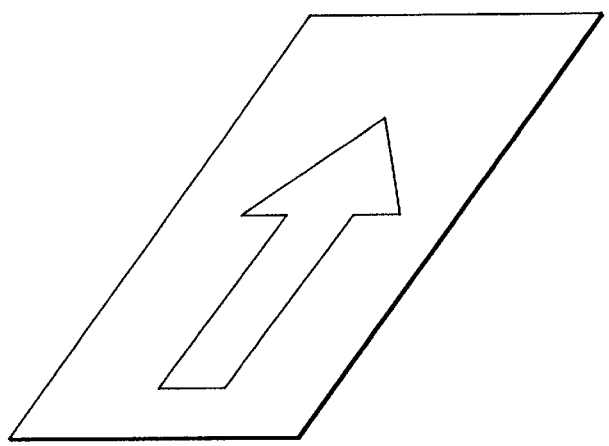
Figure 12:
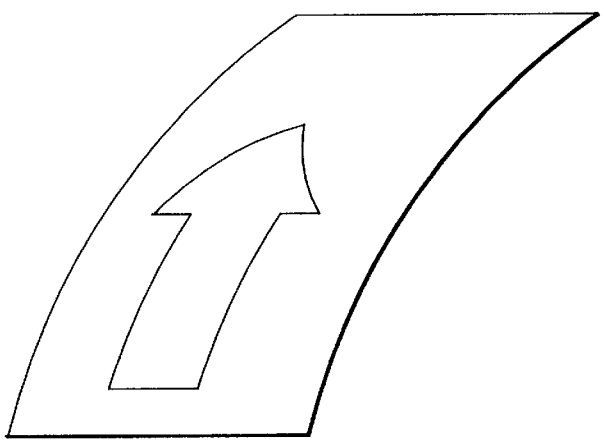

Referring now to FIGS. 10, 11, 12, 13, 14, and 15, there are shown examples of what can be done with the line control words of the Line Control table 94 in accordance with a first embodiment of the present invention. More particularly, in FIG. 10 there is shown a sprite image as defined by both the Sprite Controls of the Sprite List table 90 and the sprite data associated with a Sprite Entry in the Sprite Data table 92 without any advanced special effects as may be introduced via a subtable in the Line Control table 94. In FIGS. 11 and 12 there are shown how the sprite image of FIG. 10 can be changed to produce pseudo three dimensional effects by varying horizontal offsets on each line. For example, in FIGS. 11 and 12 each line of the sprite of FIG. 10 is offset by separate amount as defined in the line control words of a first and second subtable, respectively, of the Line Control Table 94.

Figure 13:
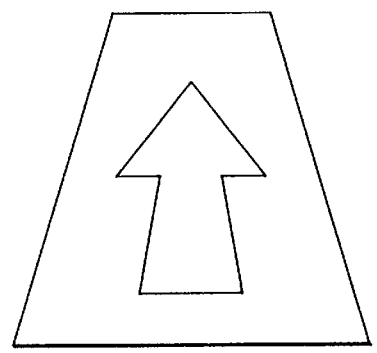

FIG. 13 shows an example of performing an advanced warping effect with horizontal magnification line controls on the sprite image of FIG. 10. More particularly, the line control words of a subtable of the Line Control Table 94, as pointed to by the Line Table Pointer of a Sprite Entry of the Sprite List table 90, defines both the amount of warping or offsetting for each edge of the sprite for each line of the sprite, and the amount of magnification to be used for each line of the sprite.

Figure 14:
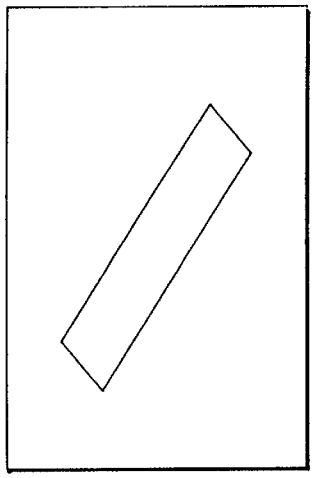
Figure 15:
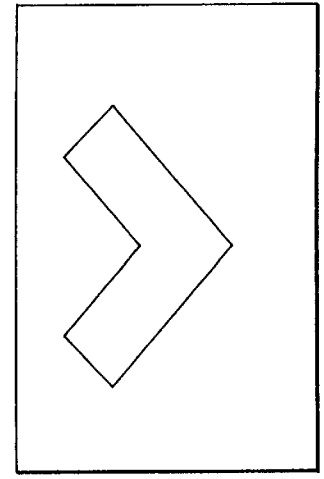

FIGS. 14 and 15 show an example of an advanced special effect of varying horizontal line mirroring on each line of a sprite. More particularly, FIG. 14 shows a sprite image as may be defined by an associated Sprite Entry of the Sprite List table 90 and the Sprite Data table 92. FIG. 15 shows how a subtable of the Line Control Table 94 can change the sprite image of FIG. 14 by varying horizontal line offsets in only the top half of the sprite image to produce a mirror image of the bottom half of the sprite image shown in FIG. 14. Other advanced special effects that can be performed with subtables of the Line Control Table 94 are, for example, (a) varying a color palette bank for 256 colors in a 4-bit sprite, (b) varying visibility control for making selective lines of a sprite image disappear, and (c) varying horizontal clipping limits for selectively clipping around a shape of a sprite image. An advantage obtained by the use of the Line Control Table 94 is that an advanced special effect created by a particular subtable can be used by many of the Sprite Entries in the Sprite List table 90. This saves memory space in contrast to building the subtable into each of the Sprite Entries as may be found in the prior art. Still further, data for a same sprite image can be used in multiple Sprite Entries of the Sprite List table 90, where each of the multiple Sprite Entries uses its Line Table Pointer portion to enter a different subtable of the Line Control Table 94. Such multiple same Sprite Entries associated with different Line Control subtables is used where a same sprite image with different advanced special effects is to be seen at different locations on the screen of the television receiver.

Returning now to FIG. 9, the Span List table 96 is an optional table which is used to save time in processing many Sprite Entries in the Sprite List table 90. In prior art systems, each of the Sprite Entries in a Sprite List table 90 are sequentially entered to determine if that sprite exists in a pixel being assembled for a horizontal line using the size and the X and Y location on a display screen designated for that sprite. As a result, the prior art systems, for example, for playing games were limited to a few number of sprites (e.g., N=8 or 16 sprites) in order to assemble the pixels for each line within the time period necessary for displaying such horizontal line on the display screen.

In the present subscriber cable box unit 10, without the optional Span List table 96 being present, the Memory Controller and Sprite State Machine 42 normally accesses each of the plurality of N Sprite Entries listed in the Sprite List table 90 of the Graphics Memory 38 to determine which of the N Sprite Entries exist in each pixel of the horizontal line being assembled. In accessing each of the N Sprite Entries of the Sprite List table 90, the Memory Controller and Sprite State Machine 42 obtains the data from the Sprite Data table 92 and the optional Line Control Table 94 needed for each sprite to produce the pixel data for each horizontal line being assembled in the Pixel Assembly Buffer 52. However, if the Memory Controller and Sprite State Machine 42 has to access and process, for example, 96 different Sprite Entries, the time necessary to process the 96 sprites would exceed a time period permitted for assembling each horizontal line of pixel data in the Pixel Assembly Buffer 52. The use of the Span List table 96 overcomes this problem.

Where the optional Span List table 96 is used, at least one register (not shown) in the Memory Controller and Sprite State Machine 42 indicates that the Span List table 96 exists, and provides all of the data necessary for the Memory Controller and Sprite State Machine 42 to properly use the Span List Table 96, including a portion designated "# Sprite Entry Words" which contains a number (integer value) of words (NW) per Sprite List Entry which is a constant integer value for each of the Sprite Entries when the Span List table 96 exists. More particularly, each Sprite Entry in the Sprite List table 90 can include words for (1) a Sprite Data Pointer, (2) Sprite Controls, (3) an optional Line Table Pointer word, (4) an optional word for optional sprite controls, and (5) an optional Field Enable Control Word. Therefore, in theory, each Sprite Entry of the Sprite List table 90 can contain from 2–5 words. When a Span List table 96 is used, each of the Sprite Entries of the Sprite List 90 includes a same number of words (e.g., 5 words) regardless of what optional words are normally required for each Sprite Entry. The purpose of the register which indicates the Number of Sprite Entry Words in each Sprite Entry is to simplify accessing of only certain ones of the Sprite Entries of the Sprite List table 90 when building the pixels of a horizontal line.

The Span List table 96 comprises one span list control word or a group of span list control words that describe which of the N sprites found in the Sprite List table 90 exist in each line. It is to be understood that the Span List table 96 is primarily used where there are many sprites (e.g., N=96 sprites) in order to reduce processing time in assembling the pixel data for each of the horizontal lines in the Pixel Assembly Buffer 52. The number of words in the Span List table 96 is dependent on the Equation No. of Span List words=$(NS/32)*(NH/NL)$, Eq. 2 where NS is the number of total sprites on the display screen, NH is the number of lines in the display screen, NL is the number of lines on the screen of a television receiver per span list word, and 32 represents the exemplary number of bits available in each word of the Span List table 96. The values for NH and NL are programmable numbers, and NL can have a value of, for example, 2, 4, 8, 16, 32, 64, or 128. More particularly, although there electrically are 525 horizontal lines of video in two fields of a standard NTSC television display, only about 440–500 lines are normally seen depending on the television receiver used. The display area of the screen where the 96 sprites are to displayed can vary from 0–500 lines for any predetermined number of sections, where each section has an equal number (NL) of lines.

Figure 16:
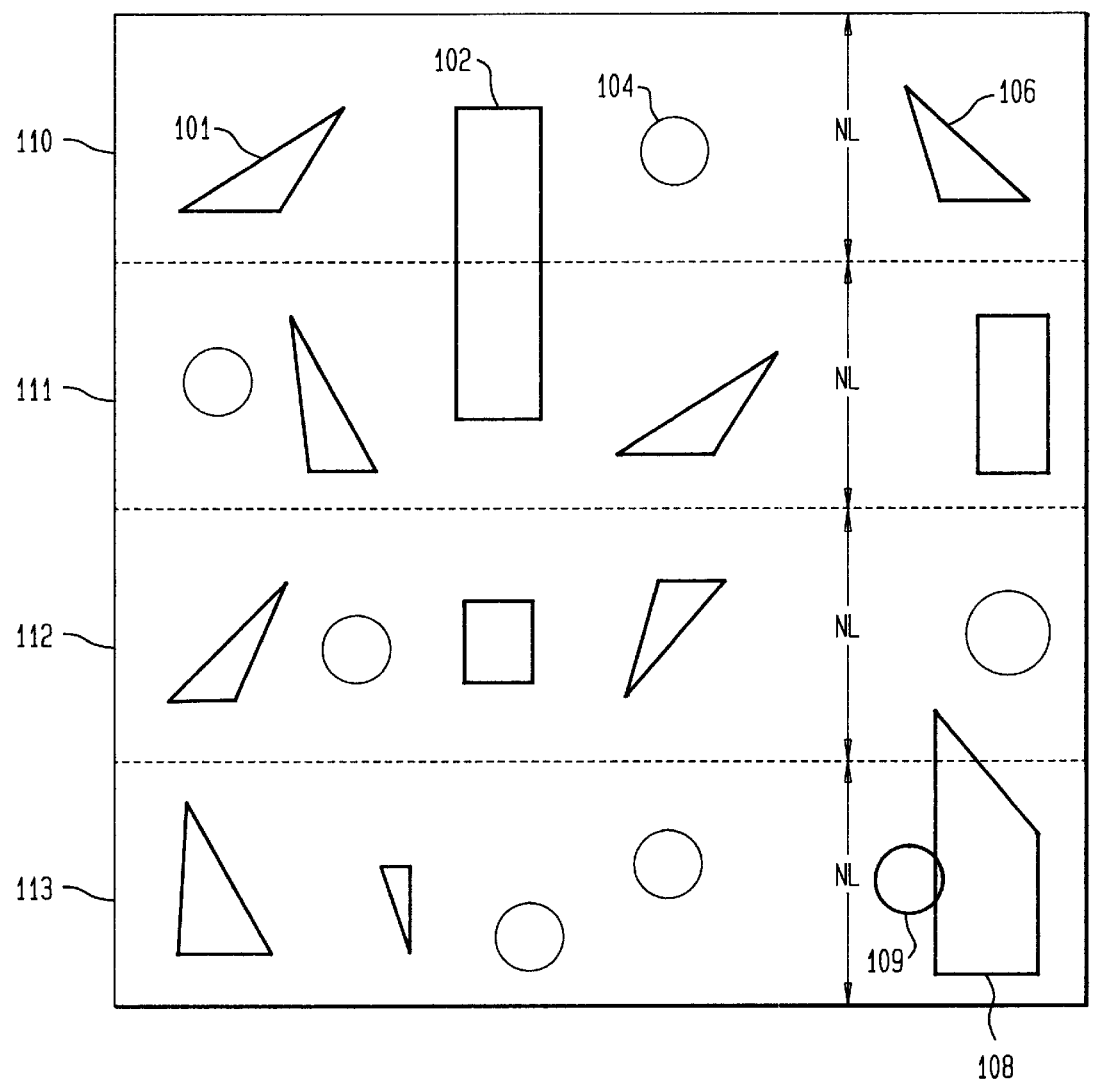
FIG. 16 is an exemplary view of a display screen using a span list table found in the Graphics Memory shown in FIG. 9 in accordance with a second embodiment of the present invention.

Referring now to FIG. 16, there is shown a portion of video display screen that is divided by dashed lines into 4 equal sections 110, 111, 112, and 113 with each section having an exemplary number of 32 lines per span list word (NL) in accordance with a second embodiment of the present invention. Therefore, the overall area of the video display screen that is used to display the exemplary 96 sprites covers 128 horizontal lines (4 sections at 32 lines/section). Still further, there is shown a plurality of sprite images, where predetermined ones of the various sprite images are designated 101, 102, 104, 106, 108, and 109, which for purposes of discussion hereinbelow will represent Sprite Entries 1, 2, 4, 6, 8, and 9, respectively, in the Sprite List table 90. In accordance with Equation (2), the number of Span List words is equal to (96 sprites/32) times (128 lines in the display screen (NH) divided by 32 lines per span list word (NL)) which results in a total of 3*4=12 span list words. More particularly, the first three Span List words are associated with section 110 of the video display screen area, the next three Span List words are associated with section 111, the next three Span List words are associated with section 112, and the last three Span List words are associated with section 113 for a total of twelve Span List words.

As is shown in Section 110 of the display screen area, only the Sprite Entries numbered 1, 2, 4, and 6 of the Sprite List Table 90 are found on any of the 32 lines of the display screen being assembled in the Pixel Assembly Buffer 52 shown in FIG. 9. Therefore, a first 32-bit word in the Span List Table 96 associated with section 110 have the 32 bits appears as,

00000000000000000000000000101011, where the right-most bit is associated with Sprite #1 Entry and the left-most bit is associated with Sprite #32 Entry in the Span List table 90 of the Graphics Memory 38. Still further, the "1s" in the Span List word indicate that sprites 1, 2, 4, and 6 are active in section 110. The remaining second and third words in the Span List table 96 associated with section 110 for sprites 33–96 each contain 32 zeros since none of these Sprites Entries in the Sprite List table 90 are active or appear in section 110. The other nine Span List words associated with sections 111–113 are coded in the same manner for the sprites active or appearing in each of these sections.

In operation, the Memory Controller and Sprite State Machine 42 of FIG. 9 determines from the one or more registers therein that a Span List table 96 exists, also obtains the data (NS, NH, and NL values, the start line for the display area, and the number of sprites) that is stored therein and needed for use with the Span List table 96, and determines the number of Span List words needed for each section of the display area in accordance with Equation (2). In assembling the pixel data for the 525 lines of the video display, when the Memory Controller and Sprite State Machine 42 reaches the start line for the Span List display area the Memory Controller and Sprite State Machine 42 first accesses the Span List words (e.g., first three words) associated with the top section (e.g., section 110) of the span list display area. From these first three words of Span List table 96, the Memory Controller and Sprite State Machine 42 determines that only Sprite Entries 1, 2, 4, and 6 are active in section 110.

The Memory Controller and Sprite State Machine 42 then first accesses Sprite Entry #1 in the Sprite List table 90 in assembling each pixel of a first horizontal line of section 110, then accesses Sprite Entries #2, #4, and #6 in sequence. The portion of the register designated "# sprite entry words" indicates how many words (NW) are used by the Memory Controller and Sprite State Machine 42 to calculate where the next active Sprite Entry is located in the Sprite List table 90. More particularly, if each Sprite Entry has five (5) words therein, then NW=5. This indicates that the start of the Sprite Entries 1, 2, 4, and 6 are found at storage locations 1, 6, 16, and 26, respectively, in the Sprite List table 90 because each Sprite Entry has five words using five sequential memory locations. Therefore, the Memory Controller and Sprite State Machine 42 sequentially jumps to locations 1, 6, 16, and 26 to obtain the 5 words associated with Sprite Entries #1, #2, #4, and #6, respectively. This avoids the time necessary to go through all of the 96 Sprite Entries to see how many words are included in each Sprite Entry, and allows the Memory Controller and Sprite State Machine 42 to easily jump to the information needed for active sprites and skip over inactive sprites for each of the sections 110–113.

It is to be understood that the Memory Controller and Sprite State Machine 42 uses a same one or more Span List words for each of the lines of a section (e.g., section 110) since the same sprites are active in each of the lines of that section. The Memory Controller and Sprite State Machine 42 operates in the same manner for each of the other sections (e.g., sections 111–113) of the display area covered by the Span List words. Still further, a single large sprite can be included in more than one section. For example, sprite images 102 and 108 in FIG. 13 for Sprite Entries #2 and #8, respectively, are included in respective sections 110–111 and 112–113. As a result the separate first Span List word for each of sections 110 and 111 include a "1" in the position designated for Sprite Entry #2, and the separate first Span List word for each of sections 112 and 113 include a "1" in the position designated for Sprite Entry #8. As is further shown in FIG. 16, the sprite images for sprites 108 and 109 partially overlap, and since the sprite 109 has a higher priority than the sprite 108, the pixels associated with sprite 109 will overwrite the pixels for sprite 108 in the overlapping area.

It was found that with the present subscriber cable box unit 10 of FIG. 1, about one hundred small Sprites can be accommodated in the Sprite List table 90 without the use of the Span List table 96. By using the data stored in the Span List table 96, it was found that many more small Sprites (e.g., up to about 3,000) can be accommodated in the Sprite List table 90 for display on the screen of a television receiver. Still further, the information in each of the portions of each of the N Sprite Entries of the Sprite List table 90, and the tables 92, 94, and 96 is inputted into the Graphics Memory 38 from the remote CPU 36 (shown only in FIG. 1) via the Memory Controller and Sprite State Machine 42 forming part of the first portion of the Video Processing Circuitry 46. This information can be updated at any time by the CPU 36.

The Field Enable Control portion of each Sprite Entry in the Sprite List table 90 relates to controls for forming a "Smoked Glass" (transparent overlay) effect with two sprites or one sprite over live video. More particularly, a "smoked glass" effect is defined as an overlapping area of two sprites or one sprite over live video where a first sprite is displayed on the screen of a television receiver on lines (e.g., even lines) of a first field of a picture, and a second sprite or live video is displayed on the screen of a television receiver on lines (e.g., odd lines) of a second field of a picture. Such effect allows an image of the first sprite to be seen while also seeing an image behind it of the second sprite which can be, for example, a captured snapshot of a frame of a live television signal that is stored as a Sprite Entry in the Graphics Memory 38, or actual live video. The two dimensional Convolver 68 then processes the assembled image to produce a "Smoked Glass" effect between the two sprites. Prior art systems primarily use software to computationally combine the two images.

In accordance with the present invention, the Field Enable Control portion of the Sprite Entry indicates that this Sprite is only to be displayed in the even-numbered or odd-numbered lines of the area of the display screen indicated for that sprite. When assembling the pixel data in each horizontal line of a display for the Sprite Entries of the Sprite List table 90, the Field Enable Control indicates whether such sprite exists on a horizontal line or not with its designated area on a display screen. This is a simple and inexpensive method of permitting a graphic or sprite to be inserted or turned on in just one of the two fields.

Referring now to FIG. 17, there is shown an exemplary section of lines 1–13 of an interlaced television receiver screen 120 wherein a first (SPRITE #1) and second (SPRITE #2) sprite are interleaved in a pixel area 121 of the screen (shown within a dashed line rectangle) in accordance with a third embodiment of the present invention. More particularly, the Sprite Entry #2 is defined by its Sprite Controls in the Sprite List table 90 of the Graphics Memory 38 as lying within the pixel area 121 formed by lines 2–7, and that Sprite Entry #2 is to be inserted or turned on in just the even numbered lines 2, 4, and 6 forming part of the first field of a frame in the pixel area 121. Still further the Sprite Entry #1 in the Sprite List table 90 is defined as occupying all of the area covered by lines 1–13 of screen 120 Since Sprite Entry #1 has a lower priority that Sprite Entry #2, Sprite Entry #1 occupies the odd-numbered lines 3, 5, and 7 in section 121 along with all of the remaining area of lines 1–13.

Returning now to FIG. 9, in order for the Memory Controller and Sprite State Machine 42 to produce the "Smoked Glass" effect, it needs to know which field is currently being displayed on the screen of the television receiver. This information indicating the current video field is provided to the Memory Controller and Sprite State Machine 42 by a 2-bit field signal (FIELD <1:0>) which indicates bits 1 and 0) transmitted by a remote video sync circuit (not shown) generally located at the Composite to Y,U,V circuitry 44 (shown in FIG. 1) of the subscriber cable box unit 10 and obtained from a received live video signal stream. This 2-bit Field signal is basically a continuously running clock signal.

The Memory Controller and Sprite State Machine 42 also reads a 4-bit Field Enable signal from the associated Sprite List Entry which indicates which field to enable of two frames stored for a sprite. It is to be understood that the entire information for the color of a color picture is transmitted within four fields of two frames in order to understand why four bits are needed for the Field Enable Signal, where each frame has two fields. Still further, the use of the two frames is not a matter of displaying the color picture, but instead it becomes a matter of the artifacts (e.g., flickering, etc.) produced on the screen of an interlaced television receiver. More particularly, in an NTSC color video signal, there are (a) 227.5 color bursts sent in each horizontal line of the picture, (b) 262.5 lines for each of two fields of a frame, and (c) 525 lines in a frame comprising the two fields. Because there are 227.5 color burst per line, if the color bursts on line 0 of field 0 go in a positive direction at a certain point, then on the next line (line 2) of field 0 the color burst goes in a negative direction at a certain point because each line contains a sequence of whole color burst plus a half of a color burst rather than a sequence of just whole color bursts. Still further, because there is an odd number of lines (525) in a frame, the color bursts in the first line (line 0) of field 0 of the next (second) frame will go in a negative direction and will be opposite in direction from line 0 of field 0 of the immediately previous frame. Thus, to get a positive going color burst in line 0 of field 0 of a frame, the repeat pattern only occurs every second frame. It is to be understood that the whole content for a color picture is present after the first frame, but that the repeat patterns of the artifacts (e.g., flickering, etc.) are a by-products of a four frame cycle. This is a result of a compromise originally made in forming the NTSC standard for transmitting color television signals that are compatible with black-and-white television signals.

When a snapshot of a live television picture is placed into the Graphics Memory 38 as a Sprite Entry in the Sprite List table 90, only one frame comprising two fields needs to be stored to subsequently re-display the picture on the screen of a television receiver. The 4-bit Field Enable control is used by the Memory Controller and Sprite State Machine 42 to indicate when a sprite is to be accessed in a certain frame or field depending on the code of the four bits. For example, a "1" in bit three of the Field Enable signal indicates that the associated sprite should be enabled in frame 1, and a "1" in bit two of the Field Enable signal indicates that the associated sprite should be enabled in frame 0. Similarly, a "1" in bit one of the Field Enable signal indicates that the associated sprite should be enabled in field 1, and a "1" in bit zero of the Field Enable signal indicates that the associated sprite should be enabled in field 0. Therefore, bits 3 and 2 are used for double frame buffered sprites while bits 1 and 0 are used to either produce a "smoked glass" effect where the sprite is only seen in one field, or for double frame buffered sprites where a sprite is seen in both fields. The Memory Controller and Sprite State Machine 42 compares the Field and Field Enable signals to determine which of the four unique fields in the two frames is currently turned on in order to display the sprite in its desired horizontal line locations, and for remodulation to the NTSC picture to be displayed on the television receiver screen by remote processing circuits (not shown) to provide correctly directed color bursts. More particularly, the information for the four field, as determined from the Field and Field Enable signals, is used for double line buffering in the Pixel Assembly Buffer 52 to determine which sprite data is to be placed in each pixel location of the Double Line Buffers 53, 54, and 55 (shown in FIG. 2). When the comparison of the Field and Field Enable signals indicate a match of fields, the sprite data is read from the Sprite Entry table 90, the Sprite Data Table 92, and the Line Control table 94 in the Graphics Memory 38, and the Double Line Buffers 53–55 in the Pixel Assembly Buffer 52 are appropriately loaded during a certain field or frame. A register (not shown) in the Memory Controller and Sprite State Machine 42 is updated from the CPU 36 via bus 48 when necessary to indicate which field and/or frame is desired for loading the data of a Sprite Entry in the Sprite List table 90 into the Pixel Assembly Buffer 52.

In accordance with the present invention, the use of simple control words or groups of bits, and a comparator for comparing Field and Field Enable signals to determine repeat patterns in horizontal lines of NTSC video signals permits a "smoked glass" effect to be formed on an interlaced display. This is in contrast to performing the same functions all in software that requires a powerful and typically relatively expensive software processor with a great deal of programming as is found in some prior art systems. In such prior art systems the processor (e.g., CPU 36 in FIG. 1) takes a part in building the picture which requires a relatively expensive CPU 36, and if the processor shuts down the building of the picture stops. An advantage of the present subscriber cable box unit 10 is that if the CPU 36 shuts down, any animation of the picture being displayed stops because the CPU 36 is not providing information of what things to move around. However, the picture is self-sustaining. More particularly, as long as the Graphics Memory 38 is not corrupted, the video graphics portion of the Video and Memory Controller 40 shown in FIGS. 2, 3, and 9 knows how to build the picture from data in the Graphics Memory 38.

It is to be appreciated and understood that the specific embodiments of the invention described hereinbefore are merely illustrative of the general principles of the invention. Various modifications may be made by those skilled in the art which are consistent with the principles set forth. For example, although the present invention has been described hereinabove for use in a subscriber cable box unit 10, it is to be understood that the present invention can be used at, for example, an editing station prior to the television signal being broadcast. In other words, the present invention can be used in television productions for creating initial products prior to their being broadcast rather than manipulating the television signal afterwards at a remote subscriber's location. This is possible because the quality and the resolution of the picture displayed on the television receiver does not change regardless of whether the editing is performed during initial production or thereafter at the subscriber's location when using the present apparatus. Therefore, it does not matter if the quality or the resolution might be better in a non-edited television production if editing is performed prior to the production being seen on the subscriber's interlaced television set or at the subscriber's location.

What is claimed is:

1. Apparatus for processing mixed video and graphic signals for display on a standard television receiver comprising:

a graphics memory comprising:

a sprite list table for listing a plurality of graphics in a predetermined sequence for display on the television receiver and for storing general information related to said graphics within control words in each listing;

a sprite data table for storing pixel data for horizontal lines of each of said graphics where the horizontal lines in the sprite data table for each of said graphics is accessed by a control word in the listing in the sprite list table for each of said graphics; and a line control table comprising control words that are accessed by a control word in the listing of predetermined ones of said graphics in the sprite list table for providing independent controls for selectively relocating pixel data in each of the horizontal lines obtained from the sprite data table to produce a predetermined special effect for each of the predetermined ones of said graphics; and a memory controller and sprite state machine for accessing the tables of the graphics memory in a predetermined sequence in order to assemble and superimpose each of said graphics at predetermined locations in the horizontal lines of a received video signal being displayed on a screen of the television receiver.

2. The apparatus of claim 1 wherein:

the graphics memory further comprises a span list table comprising at least one span list control word for a predetermined number of horizontal lines forming each of a plurality of predetermined separate sections of the screen of the television receiver, the at least one span list control words comprising separate predetermined fixed bits of data defining which of a plurality of N graphic listings in the sprite list table are active and appear in the associated predetermined section; and the memory controller and sprite state machine first accesses the at least one span list control word in the span list table when assembling a predetermined section of the screen of the television receiver, and then only accesses the graphic listings in the sprite list table that are found active and appear in the at least one span list control word.

3. The apparatus of claim 2 wherein the total number of span list words in the span list table is defined as (NS/X)* (NH/NL) where NS is the total number of graphics appearing on the screen of the television receiver, X is the number of bits available in each span list control word, NH is the number of horizontal lines in all of the plurality of predetermined separate sections of the screen of the television receiver, and NL is the number of horizontal lines per the at least one span list control word found in each predetermined section of the screen of the television receiver.

4. The apparatus of claim 2 wherein a register defines the total number of control words in that graphic listing, and each of the graphic listings contains a same number of total control words.

5. The apparatus of claim 1 wherein the memory controller and sprite state machine is responsive to field enable signals from the sprite list table indicating which field of a two-field frame of a video picture is being displayed on the screen of the television receiver for accessing and assembling a first predetermined graphic listed in the sprite list table for horizontal lines of only one of the two fields and a second predetermined graphic listed in the sprite list table or a live television signal for horizontal lines of the other one of the two fields.

6. The apparatus of claim 1 further comprising:

a data pipe responsive to pixel data accessed by the memory controller and sprite state machine for each of the horizontal lines from the sprite data table and the line control table for each of the graphic listings in the sprite list table for generating a selective address for each of the pixel data for each horizontal line in accordance with predetermined control words in the sprite listing table and the line control table; and a pixel assembly buffer responsive to the predetermined selective address for each pixel data from the data pipe for each horizontal line, for assembling and buffering each horizontal line of pixel data in accordance with each predetermined selective address generated by the data pipe for that horizontal line of pixel data.

7. The apparatus of claim 1 wherein said graphics in the sprite list table are sequential listed in a predetermined priority, and pixel data of a first graphic of a higher priority overwrites pixel data of second graphic of a lower priority in a pixel location in assembling a horizontal line where the first and second graphics overlap on a screen of the television receiver as the memory controller and sprite state machine accesses the graphic listings in sequence to assemble a horizontal line of pixel data.

8. Apparatus for processing mixed video and graphic signals for display on a standard television receiver comprising:
   a graphics memory comprising:
      a sprite list table for listing a plurality of graphics in a predetermined sequence for display on the television receiver and for storing general information related to said graphics within control words in each listing;
      a sprite data table for storing pixel data for horizontal lines of each of said graphics where the horizontal lines in the sprite data table for each of said graphics is accessed by a control word in the listing in the sprite list table for each of said graphics; and
      a span list table comprising at least one span list control word for a predetermined number of horizontal lines forming each of a plurality of predetermined separate sections of the screen of the television receiver, the at least one span list control words comprising separate predetermined fixed bits of data defining which of a plurality of N graphic listings in the sprite list table are active and appear in the associate predetermined section; and
      a memory controller and sprite state machine that first accesses that at least one span list control word in the span list table when assembling a predetermined section of a screen of the television receiver, and then only accesses the graphic listings in the sprite list table and the sprite data table that are found active and appear in the at least one span list control word in order to superimpose the accessed graphics at predetermined locations in the horizontal lines of a received video picture being displayed on the screen of the television receiver.

9. The apparatus of claim 8 wherein the total number of span list words in the span list table is defined as (NS/X)*(NH/NL) where NS is the total number of graphics appearing on the screen of the television receiver, X is the number of bits available in each span list control word, NH is the number of horizontal lines in all of the plurality of predetermined separate sections of the screen of the television receiver, and NL is the number of horizontal lines per the at least one span list control word found in each predetermined section of the screen of the television receiver.

10. The apparatus of claim 8 wherein each of the graphic listings in the sprite list table comprise a sprite list entry control word that defines the total number of control words in that graphic listing, and each of the graphic listings contains a same number of total control words for permitting the memory controller and sprite state machine to jump to the graphic listings in the sprite list table that are found active and appear in the at least one span list control word.

11. The apparatus of claim 8 wherein:
   the graphics memory further comprises a line control table comprising control words that are accessed by a control word in the listing of predetermined ones of said graphics in the sprite list table for providing independent controls for selectively relocating pixel data in each of the horizontal lines obtained from the sprite data table to produce a predetermined special effect for each of the predetermined ones of said graphics; and the memory controller and sprite state machine accesses the sprite list table, the sprite data table, and the line control table of the graphics memory in a predetermined sequence in order to assemble and display each of said graphics at predetermined locations in the horizontal lines on the screen of the television receiver.

12. The apparatus of claim 11 further comprising:
   a data pipe responsive to pixel data accessed by the memory controller and sprite state machine for each of the horizontal lines from the sprite data table and the line control table for each of the graphic listings in the sprite list table for generating a selective address for each of the pixel data for each horizontal line in accordance with predetermined control words in the sprite listing table and the line control table; and
   a pixel assembly buffer responsive to the predetermined selective address for each pixel data from the data pipe for each horizontal line, for assembling and buffering each horizontal line of pixel data in accordance with each predetermined selective address generated by the data pipe for that horizontal line of pixel data.

13. The apparatus of claim 8 wherein the memory controller and sprite state machine is responsive to field enable signals from the sprite list table indicating which field of a two-field frame of a video picture is being displayed on the screen of the television receiver for accessing and assembling a first predetermined graphic listed in the sprite list table for horizontal lines of only one of the two fields and a second predetermined graphic listed in the sprite list table or a live television signal for horizontal lines of the other one of the two fields.

14. The apparatus of claim 8 wherein said graphics in the sprite list table are sequential listed in a predetermined priority, and pixel data of a first graphic of a higher priority overwrites pixel data of second graphic of a lower priority in a pixel location in assembling a horizontal line where the first and second graphics overlap on a screen of the television receiver as the memory controller and sprite state machine accesses the graphic listings in sequence to assemble a horizontal line of pixel data.

15. Apparatus for processing mixed video and graphic signals for display on a standard television receiver comprising:
   a graphics memory comprising:
      a sprite list table for listing a plurality of graphics in a predetermined sequence for display on the television receiver and for storing general information related to said graphics within control words in each listing; and
      a sprite data table for storing pixel data for horizontal lines of each of said graphics where the horizontal lines in the sprite data table for each of said graphics is accessed by a control word in the listing in the sprite list table for each of said graphics; and
      a memory controller and sprite state machine responsive to field enable signals from the sprite list table indicating which field of a two-field frame of a video picture is being displayed on a screen of the television receiver for accessing and assembling a first predetermined graphic listed in the sprite list table for horizontal lines of only one of the two fields and a second predetermined graphic listed in the sprite list table or a live television signal for horizontal lines of the other one of the two fields.

16. The apparatus of claim 15 wherein the graphics memory further comprises a line control table comprising control words that are accessed by a control word in the listing of predetermined ones of said graphics in the sprite list table for providing independent controls for selectively relocating pixel data in each of the horizontal lines obtained from the sprite data table to produce a predetermined special effect for each of the predetermined ones of said graphics.

17. The apparatus of claim 16 further comprising:
a data pipe responsive to pixel data accessed by the memory controller and sprite state machine for each of the horizontal lines from the sprite data table and the line control table for each of the graphic listings in the sprite list table for generating a selective address for each of the pixel data for each horizontal line in accordance with predetermined control words in the sprite listing table and the line control table; and
a pixel assembly buffer responsive to the predetermined selective address for each pixel data from the data pipe for each horizontal line, for assembling and buffering each horizontal line of pixel data in accordance with each predetermined selective address generated by the data pipe for that horizontal line of pixel data.

18. The apparatus of claim 15 wherein:
the graphics memory further comprises a span list table comprising at least one span list control word for a predetermined number of horizontal lines forming each of a plurality of predetermined separate sections of the screen of the television receiver, the at least one span list control words comprising separate predetermined fixed bits of data defining which of a plurality of N graphic listings in the sprite list table are active and appear in the associated predetermined section; and
the memory controller and sprite state machine first accesses the at least one span list control word in the span list table when assembling a predetermined section of the screen of the television receiver, and then only accesses the graphic listings in the sprite list table that are found active and appear in the at least one span list control word.

19. The apparatus of claim 18 wherein the total number of span list words in the span list table is defined as (NS/X)* (NH/NL) where NS is the total number of graphics appearing on the screen of the television receiver, X is the number of bits available in each span list control word, NH is the number of horizontal lines in all of the plurality of predetermined separate sections of the screen of the television receiver, and NL is the number of horizontal lines per the at least one span list control word found in each predetermined section of the screen of the television receiver.

20. The apparatus of claim 18 wherein each of the graphic listings in the sprite list table comprise a sprite list entry control word that defines the total number of control words in that graphic listing, and each of the graphic listings contains a same number of total control words.

21. The apparatus of claim 15 wherein the memory controller and sprite state machine is responsive to field enable signals from the sprite list table indicating which field of a two-field frame of a video picture is being displayed on the screen of the television receiver for accessing and assembling a first predetermined graphic listed in the sprite list table for horizontal lines of only one of the two fields and a second predetermined graphic listed in the sprite list table or a live television signal for horizontal lines of the other one of the two fields.

22. The apparatus of claim 15 wherein said graphics in the sprite list table are sequential listed in a predetermined priority, and pixel data of a first graphic of a higher priority overwrites pixel data of second graphic of a lower priority in a pixel location in assembling a horizontal line where the first and second graphics overlap on a screen of the television receiver as the memory controller and sprite state machine accesses the graphic listings in sequence to assemble a horizontal line of pixel data.

* * * * *

UNITED STATES PATENT AND TRADEMARK OFFICE
CERTIFICATE OF CORRECTION

PATENT NO. : 5,835,103
DATED : November 10, 1998
INVENTOR(S) : Butler et al.

It is certified that error appears in the above-identified patent and that said Letters Patent is hereby corrected as shown below:

In column 1, at line 15, after "No." delete "(GID907)" and insert therefor --08/523,789--.

At line 27, delete "filed" and insert therefor --field--.

In claim 2, in column 22, at line 16, delete "words" and insert therefor --word--.

In claim 7, in column 22, at line 67, delete "sequential" and insert therefor --sequentially--.

In claim 7, in column 23, at line 2, after "of" insert --a--.

In claim 8, in column 23, at line 24, delete "words" and insert therefor --word--.

In claim 10, in column 23, at line 51, delete "comprise" and insert therefor --comprises--.

UNITED STATES PATENT AND TRADEMARK OFFICE
CERTIFICATE OF CORRECTION

PATENT NO. : 5,835,103
DATED : November 10, 1998
INVENTOR(S) : Butler et al.

It is certified that error appears in the above-identified patent and that said Letters Patent is hereby corrected as shown below:

In claim 14, in column 24, at line 33, delete "sequential" and insert therefor --sequentially--.

In claim 14, in column 24, at line 35, prior to "second" insert --a--.

In claim 18, in column 25, at line 27, delete "words" and insert therefor --word--.

In claim 22, in column 26, at line 28, delete "sequential" and insert therefor --sequentially--.

In claim 22, in column 26, at line 30, prior to "second" insert --a--.

Signed and Sealed this

Fourteenth Day of September, 1999

Attest:

Q. TODD DICKINSON

*Attesting Officer*   *Acting Commissioner of Patents and Trademarks*